(12) United States Patent
Rose

(10) Patent No.: US 8,452,777 B2
(45) Date of Patent: May 28, 2013

(54) DYNAMIC SUBMISSION AND PREFERENCE INDICATOR

(75) Inventor: R. Kevin Rose, San Francisco, CA (US)

(73) Assignee: LinkedIn Corporation, Mountain View, CA (US)

( * ) Notice: Subject to any disclaimer, the term of this patent is extended or adjusted under 35 U.S.C. 154(b) by 806 days.

(21) Appl. No.: 12/012,509

(22) Filed: Feb. 1, 2008

(65) Prior Publication Data

US 2013/0066858 A1 Mar. 14, 2013

Related U.S. Application Data

(60) Provisional application No. 60/899,096, filed on Feb. 1, 2007.

(51) Int. Cl.
*G06F 7/00* (2006.01)
*G06F 17/30* (2006.01)

(52) U.S. Cl.
USPC .......................................................... 707/748

(58) Field of Classification Search
USPC .......................................... 707/705, 736, 748
See application file for complete search history.

(56) References Cited

U.S. PATENT DOCUMENTS

| | | | |
|---|---|---|---|
| 7,571,145 B2 * | 8/2009 | Boies et al. ...................... | 706/20 |
| 7,599,938 B1 * | 10/2009 | Harrison, Jr. ................. | 705/7.29 |
| 7,870,475 B2 * | 1/2011 | Schachter ...................... | 715/206 |
| 8,230,320 B2 * | 7/2012 | Brooks et al. .................. | 715/206 |
| 2002/0032776 A1 * | 3/2002 | Hasegawa et al. ............. | 709/225 |
| 2003/0011632 A1 * | 1/2003 | Gupta et al. ................... | 345/747 |
| 2004/0205065 A1 * | 10/2004 | Petras et al. ...................... | 707/5 |
| 2005/0171938 A1 * | 8/2005 | Fisher et al. ...................... | 707/3 |
| 2006/0265503 A1 * | 11/2006 | Jones et al. .................... | 709/227 |
| 2006/0284744 A1 * | 12/2006 | Shotland ......................... | 341/50 |
| 2007/0038646 A1 * | 2/2007 | Thota ............................ | 707/100 |
| 2007/0061297 A1 * | 3/2007 | Bihun et al. ...................... | 707/3 |
| 2007/0078884 A1 * | 4/2007 | Ott et al. ....................... | 707/102 |
| 2007/0124208 A1 * | 5/2007 | Schachter et al. .............. | 705/14 |
| 2007/0174865 A1 * | 7/2007 | Jing et al. ......................... | 725/28 |
| 2007/0179835 A1 * | 8/2007 | Ott et al. ....................... | 705/10 |
| 2007/0180027 A1 * | 8/2007 | Boylan ......................... | 709/204 |
| 2007/0198510 A1 * | 8/2007 | Ebanks ............................ | 707/5 |
| 2007/0220048 A1 * | 9/2007 | Ott ............................ | 707/104.1 |
| 2007/0255753 A1 * | 11/2007 | Pomerantz ................. | 707/104.1 |
| 2007/0288384 A1 * | 12/2007 | Pappas et al. ................... | 705/52 |
| 2007/0288426 A1 * | 12/2007 | Schachter ......................... | 707/2 |
| 2008/0091684 A1 * | 4/2008 | Ellis et al. ....................... | 707/10 |
| 2008/0235005 A1 * | 9/2008 | Golan et al. ...................... | 704/9 |
| 2009/0132510 A1 * | 5/2009 | Dimitrova et al. ............... | 707/5 |

* cited by examiner

*Primary Examiner* — Jeffrey A Burke
(74) *Attorney, Agent, or Firm* — Park, Vaughan, Fleming & Dowler, LLP

(57) ABSTRACT

Indicating preference for a content contribution is disclosed. A request for information associated with the content contribution is received from a first entity. The status of the content contribution is determined. A response is provided to the first entity. Determining the status of the content contribution includes determining whether a submission of the content contribution was previously received.

21 Claims, 25 Drawing Sheets

502  514
8 Comments: 3 by Friends
518
sort by date (-4 diggs or higher) ▽    Turn Profanity Filter On 504  by Bob 21 hours ago    + 18 diggs   520
One thing the article didn't mention is just how expensive it is to build one of these. I'd estimate the
cost at $100 if you buy the parts at garage sales.    [reply]

510    by Legolas 3 hours ago    - 1 digg
    524
    Bob rul3z! Come play poker on my website!

506  by David 20 hours ago    ☆ Bob + 14 diggs
Something else to consider is that the project will take a lot of space and make a lot of noise/dust. If
you don't have a workshop, you probably want to make sure your neighbors are out of town. :)    [reply]

by Leonardo 19 hours ago    + 4 diggs
This was on the front page over a week ago. Dupe! http://digg.com/design/
Build_Your_Own_Microwave
    [reply]

by TomTom 18 hours ago    + 2 diggs
I can't believe someone did this!
    [reply]

508  by CharlieB 10 hours ago    ☆ Bob + 11 diggs
Ok, I tried it out. Here are some pictures I took: http://www.charlieb.com/pix/microwave. As you can
see, it didn't work very well.    [reply]

516    by shawnharvey 19 hours ago    [below viewing threshold, show comment] -75 diggs
    522
510  by tomlee 7 hours ago    - 2 diggs
Dood!
    [reply]  526

Add Your Comment
by Alice (HTML tags aren't allowed. Comments are editable for 3 min.)

[Check Spelling] [Submit Comment]    528

FIG. 5

Digg for Stories: movies

Category: [movies (61) ▼]   Sort by: [newest ▼]                    Story View | Cloud View > "Casino Royale" Full Trailer  > Texas Chainsaw Massacre Prequel Poster!

> Look out Michael Jackson, check out this moon walking Manakin bird > Sci-Fi Channel ponders 'Doomsday' scenarios > Filmmaking Central 2.0 Launches!  > Derek Boyar: Dead or Alive's Bayman  > Who can resist eating a burger?  > A reality TV show about...cats.  > Chuck Norris Facts

> The guy whos been to the Sun  > Semi-truck transforms into AWESOME mobile cinema  > AT&T Backs TV Multicasts  > Scots Are Top Buyers of Pirated DVDs > Snakes on a Plane Trailer on the Web  > Star Wars Episode VI, VII, IX will happen  > Why the Star Wars Prequel trilogy changed the sense of the Original trilogy > Best AT-AT replicas ever, for sale!  > Netflix spams paying customers with banner ads  > Cyberhome busted for importing counterfeit DVD players

> Eminem Goes "Gun" Crazy  > The gods are laughing  > What made Connery win the Lifetime Achievement award?

> Blu-ray Discs and Samsung Player Launch on Track for June  > Myths of Internships  > 24 and Buffy offered for download  > A Skiddles Classic  > Hope is Emo > Dogs and Their Fine Noses Find New Career Paths  > 600 Powermacs Clean Up James Bond Movies For Sweet DVD Set (See Pix)

> Cool Homemade Transformers Costume (video)  > Superman A&E documentary now online  > The Transformers  > Uwe Wants to Fight Film Critics!

> Upcoming DC Movies and News!!!  > A blind Japanese guitarist Plays Some nice Stuff  > Fan Film Documentary Outlines Popular Film Craft  > Michael Jackson was kidnapped by aliens!

> Superman May Return to Krypton (or what's left of it) on DVD  > World Cup Team Tactics  > An Inconvenient...Cover-up?  > Now Showing: "USB" - The Short Movie > Theater-Style Popcorn Maker for your Home  > Guy Walks on Water with Bare foot!  > 20+ years prior to Sandler's 'Click' Seattle comedy sketch did same premise

FIG. 10

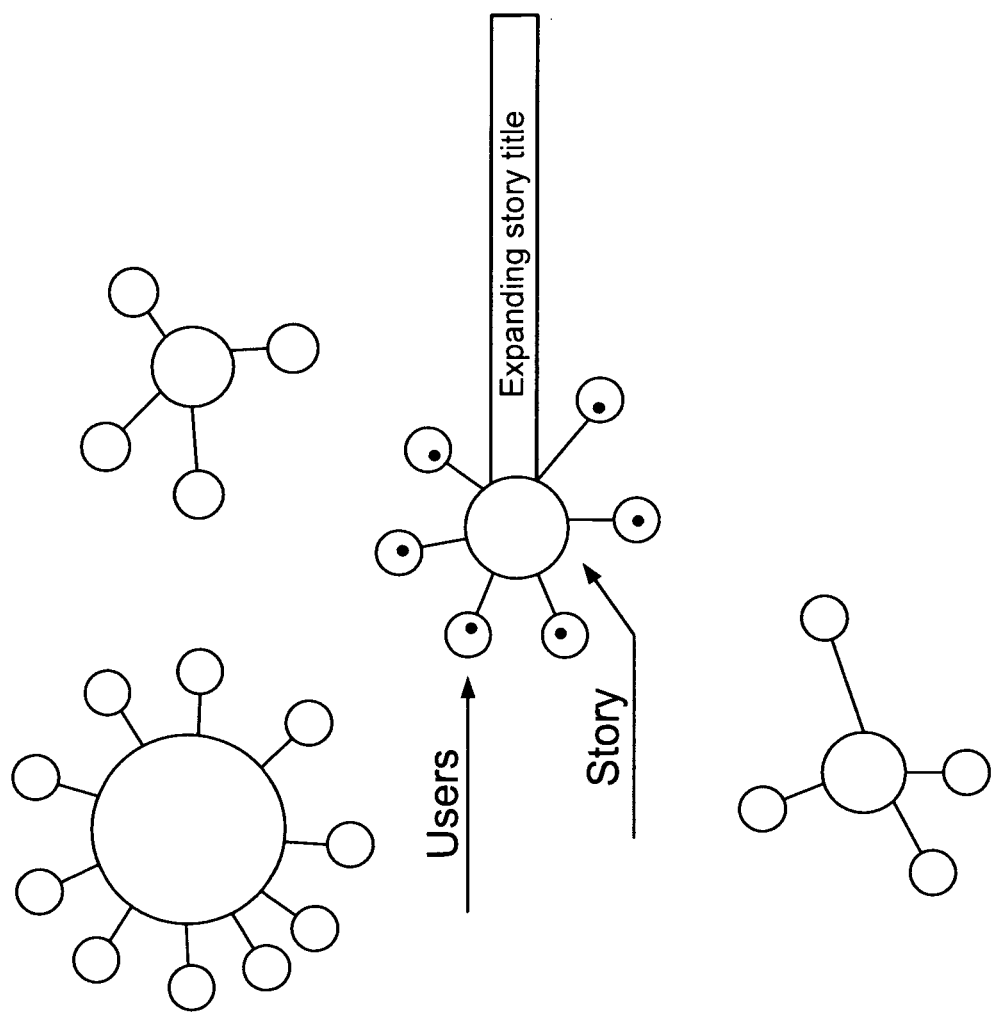

Café Le French 1200

15 diggs digg it
1202 submitted by David 7 hours 26 minutes ago (via http://www.cafelefrench.com/menu)
Delicious tasting menu changes weekly. Menu focuses on seasonal ingredients. Can be very crowded at lunch. More...
Cuisine: French Bistro
TAGS: souflée                    1204
Location: California >> San Francisco >> South of Market
21 Comments  Problem?

FIG. 12B http://services.digg.com/stories?link=http%3A%2F%2Fdiggtheblog.com

2002

```
<?xml version="1.0" encoding="utf-8" ?>
<stories offset="0" timestamp="1156201406" total="1" count="1">
  <story id="473148"
    link="http://diggtheblog.com"
    submit_date="1153491877"
    digs="2127"
    comments="171"
    href="http://digg.com/tech_news/Digg_Adds_Digg_Sports_and_Minor_Changes"
    promote_date="1153492819"
    status="popular"/>
  <title>Digg Adds Digg Sports and "Minor Changes" </title> <description>Digg has finally added the digg sports category! Other changes include being able to set the default container on digg! Thank you digg!
  </description>
  <user name="digger_twit" />
  <topic name="Tech Industry News" short_name="tech_news" /> <container name="Technology" short_name="technology" /> </story> </stories>
```

2004

```
<?xml version="1.0" encoding="utf-8" ?>
<stories offset="0" timestamp="1156202225" total="0" count="0" />
```

```
<script src="http://digg.com/tools/diggthis.js" type="text/javascript"></script>
```

FIG. 21A

```
<script type="text/javascript">
digg_url = 'WEBSITE_URL';
</script>
<script src="http://digg.com/tools/diggthis.js" type="text/javascript"></script>
```

FIG. 21B

```
<script type="text/javascript">
digg_url = 'WEBSITE_URL';
digg_bgcolor = '#ff9900';
digg_skin = 'compact';
digg_window = 'new';
</script>
<script src="http://digg.com/tools/diggthis.js" type="text/javascript"></script>
```

FIG. 21C

```
<script type="text/javascript">
digg_url = 'WEBSITE_URL';
digg_title = 'TITLE';
digg_bodytext = 'BODY';
digg_media = 'MEDIA';
digg_topic = 'TOPIC';
</script>
<script src="http://digg.com/tools/diggthis.js" type="text/javascript"></script>
```

FIG. 21D

DYNAMIC SUBMISSION AND PREFERENCE INDICATOR

CROSS REFERENCE TO OTHER APPLICATIONS

This application claims priority to U.S. Provisional Patent Application No. 60/899,096 entitled DYNAMIC SUBMISSION AND PREFERENCE INDICATOR filed Feb. 1, 2007 which is incorporated herein by reference for all purposes.

BACKGROUND OF THE INVENTION

Publishers typically seek to obtain as many viewers (listeners, users, etc.) of content as possible. For example, a freelance writer with a blog may use advertising on his blog to support himself. It is likely that the more readers the writer can garner, the more revenue the writer will receive from the advertisements. Product manufacturers and service providers also typically seek to expose their products/services to as many individuals as possible. One way of increasing the audience for a particular piece of content (or other product/service) is to encourage existing viewers to share their preferences for the content with others.

There thus exists an ongoing need for improved methods of encouraging individuals to indicate their preferences for content.

BRIEF DESCRIPTION OF THE DRAWINGS

Various embodiments of the invention are disclosed in the following detailed description and the accompanying drawings.

FIG. 1B illustrates an embodiment of an interface to a preference system.

FIG. 5 illustrates an embodiment of an interface to a preference system.

FIG. 10 illustrates an embodiment of a visualization interface.

FIG. 11 illustrates an embodiment of a visualization interface.

FIG. 12B illustrates an embodiment of an interface to a preference system.

FIG. 20 illustrates an example of a data snippet according to one embodiment and example responses.

FIG. 21A illustrates an example of a data snippet.

FIG. 21B illustrates an example of a data snippet.

FIG. 21C illustrates an example of a data snippet.

FIG. 21D illustrates an example of a data snippet.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
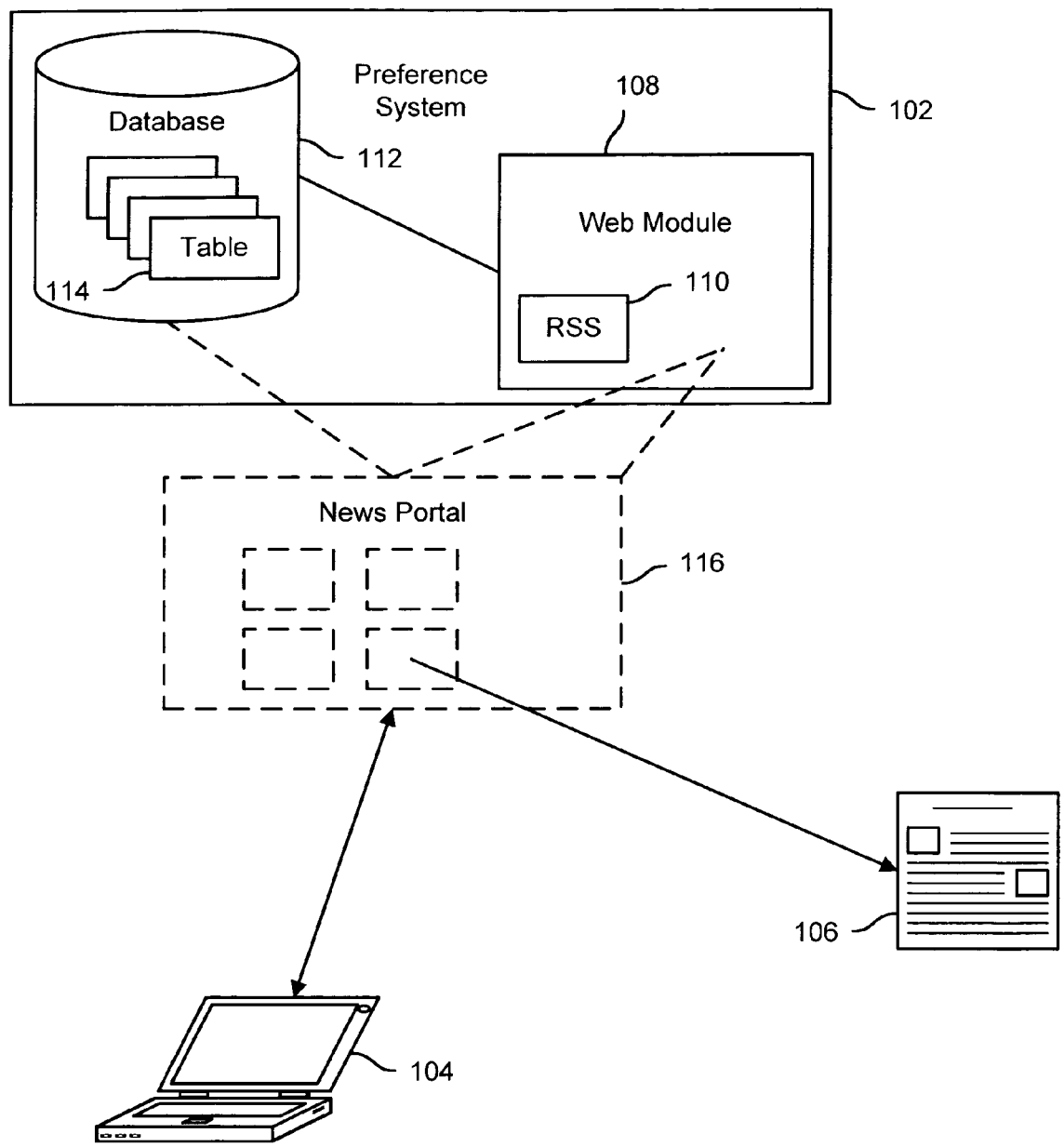
FIG. 1A illustrates an embodiment of an environment for collecting and managing content contributions.

FIG. 1A illustrates an embodiment of an environment for collecting and managing content contributions. Users, such as user 104, submit content (hereinafter a "story contribution" and a "third party news article contribution") to preference system 102. In the example shown, content is submitted in part by providing to preference system 102 the uniform resource locator (URL) of a story, such as a story found on web page 106.

Preference system 102 includes a web module 108 that provides typical web server functionality such as serving website 116, capturing user input, and providing Really Simple Syndication (RSS) feed (110) support. In the example shown, web module 108 is an Apache HTTP server that supports running PHP scripts. Web module 108 is interfaced with a database 112, such as through a MySQL database backend.

As described in more detail below, users are made aware of the submitted content through website 116 and features such as RSS feeds. In addition to providing a link to the content (e.g., a hyperlink to web page 106) and information such as a summary of the story and the date and time it was submitted, website 116 permits users to indicate their preferences for the content by making a variety of interactions. For example, users can "digg" a story to indicate their like of its content, "bury" a story to indicate problems with the content, and may also take other actions such as commenting on the content. These actions (including the initial submission of the content contribution) are referred to herein collectively as "preference events."

Whenever a preference event occurs (e.g., whenever a user submits, diggs, buries, or comments on content), the event is recorded in database 112 along with associated information such as the identity of the user and a time/date stamp. As described in more detail below, information recorded in database 112 is used in a variety of ways, such as in conjunction with visualization tools that query database 112 and/or make use of data extracted from database 112.

In some embodiments, the infrastructure provided by portions of preference system 102 is located on and/or replicated across a plurality of servers rather than the entirety of preference system 102 being collocated on a single platform. Such may be the case, for example, if the contents of database 112 are vast and/or there are many simultaneous visitors to site 116.

Figure 1B:
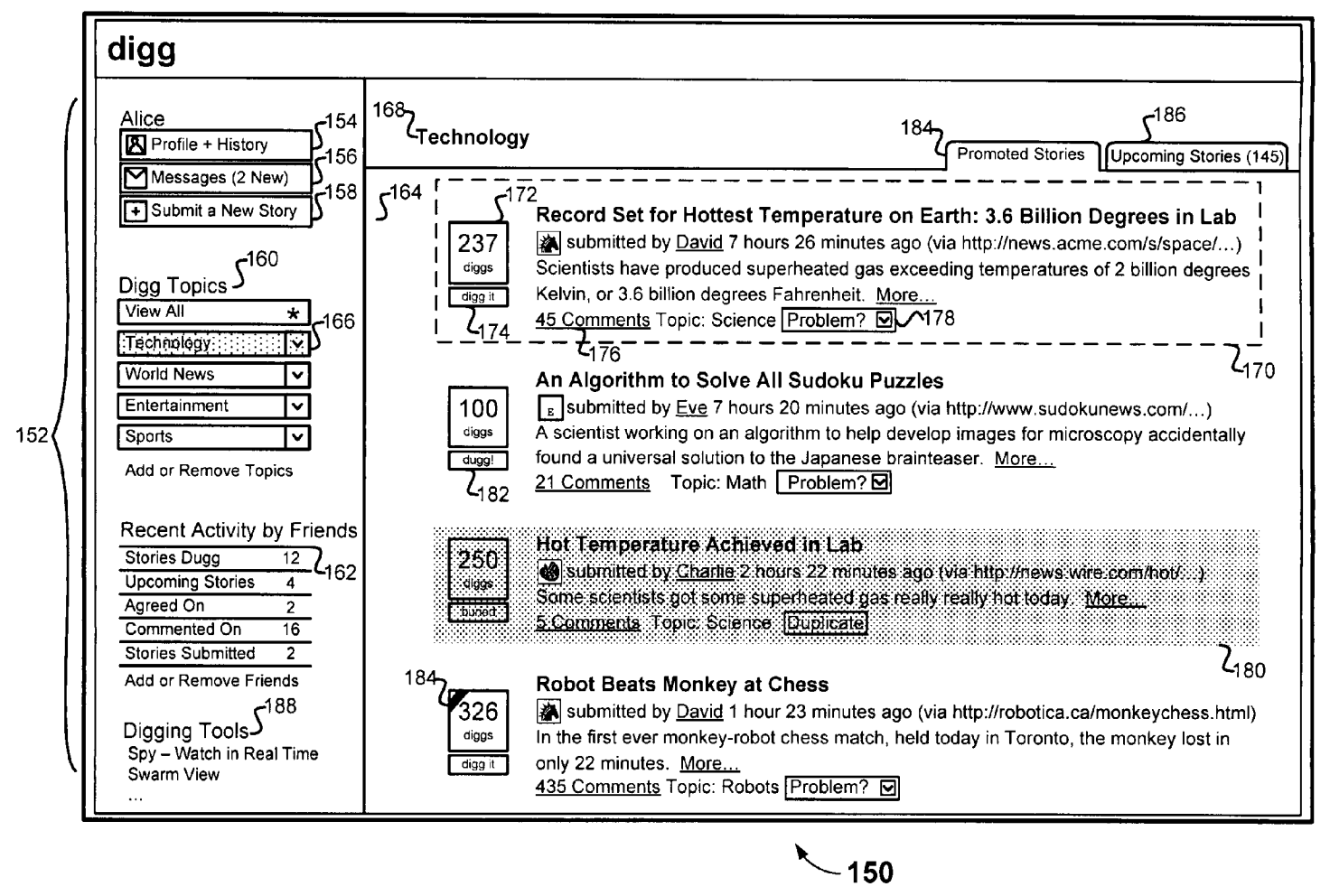

FIG. 1B illustrates an embodiment of an interface to a preference system. The example shown is an implementation of a portion of website 116, as rendered in a browser. A user, known as "Alice" is logged into site 116. Interface 150 includes a sidebar 152 that provides access to various system services. For example, by selecting region 154 of sidebar 152, Alice is presented with an interface that permits her to view her profile and manage account settings such as her current email address and password; view previous preference events she's taken (her "history"); and access friend-related features described in more detail below. Region 156 provides an indication of whether Alice has any messages and will present her with an interface to a message system (such as a mailbox) if selected. As described in more detail below, by selecting region 158, Alice will be presented with an interface through which she can submit a news story for inclusion on system 102.

Region 160 displays a list of categories into which news stories are grouped. If "View All" is selected, stories from all categories will be displayed in story window 164. As shown, the "Technology" category is selected. In some embodiments, visual indications of what category is selected are presented. In the example shown, the selected category is highlight (represented here by stippling) at 166, and the title of the category appears above story window 164 at 168. In some embodiments, Alice can configure which topics are available to her on site 116. For example, if Alice dislikes Sports, she can configure interface 150 to never show her any sports-related stories, even when viewing using the "View All" option.

Story window 164 typically includes one or more story entries 170. In the example shown, a story entry includes the title of a story, as well as other associated information, such as who submitted the story and when, the external URL of the story, the category to which the story belongs, and a summary of the story. As described in more detail below, links are provided to the story directly (such as by clicking on the title), as well as to an area of site 116 associated with the story, referred to herein as the story's permalink. For example, by clicking on the comments link (176) of the story, Alice will be presented with the comments portion of the permalink described in more detail below.

Story entry 170 also includes a problem reporting region 178. Users may report problems for a variety of reasons. For example, the first story entry and the third story entry shown describe the same news—scientists superheating a gas. Alice has selected the problem, "duplicate" story, from problem reporting region 178. As described in more detail below, this is one form of burying a story. In some embodiments, buried stories are displayed differently, or removed entirely from the user's interface. In the example shown, once a story is buried, it is greyed out, represented here by stippling (180).

As described in more detail below, each story has one or more scores associated with it. In the example shown, the "digg" score (172) for each story is displayed, as is an interactive region beneath the score (box 174) that allows a user to "digg" the story. The first story has been dugg 237 times, but has not been dugg by Alice. As described in more detail below, if Alice were to select region 174, a variety of actions would be immediately taken, including increasing the digg score of the story and updating the region's text from "digg it" to "dugg!" as shown in region 182.

Alice is currently viewing a "promoted stories" (184) view of story window 164. This means that all of the stories presented to Alice on the current view of the interface have exceeded a promotion threshold. One example of a promotion threshold is the raw number of diggs. Other requirements/factors may be used for thresholding in addition to or instead of a digg score, such as requiring that a certain amount of time elapse between story submission and story promotion, the speed with which stories are being dugg, information associated with users that have dugg the story, etc. Because some threshold of users must agree that a story has merit before being promoted, stories shown in promoted view 184 are unlikely to contain spam or otherwise be inherently inappropriate for Alice's viewing.

In some embodiments, different thresholds are used for different stories, such as for stories in different categories. For example, the promotion of a math related story may only require 100 diggs whereas a story about the president may require 500 diggs.

If Alice selects the upcoming stories tab (186), only stories which have not yet met the appropriate threshold will be displayed. For example, newly submitted stories which have not yet been "dugg" by a sufficient number of people will be presented by selecting tab 186. In some embodiments, if a story languishes in the upcoming stories pool for more than a certain period of time without receiving a sufficient digg score to be promoted (e.g., for a week), the story is removed from the pool and can only be found via its permalink or through a search. In some embodiments, such stories are deleted from database 112. Such stories are typically indicative of spam, inaccuracies, and old news. Similarly, if enough users bury a story, the story may be removed from the pool and/or database 112.

In other embodiments, other views of stories may be presented as applicable, such as a view that unifies both the promoted and the upcoming stories. In the example shown, because Alice has selected the "Technology" category (166), only technology related stories are presented in the promoted stories (184) and upcoming stories (186) views. Similarly, the topics of the presented stories (e.g., "Math," are all subtopics of Technology). In some embodiments, the information presented with the story entry may vary, such as from topic to topic. For example, if Alice selected "View All" at 160, the listed topic may be the top level category to which the story belongs (e.g., "Technology") or include a drilled down description (e.g., "World News—Canada—Elections").

As described in more detail below, portion 162 of interface 150 displays the recent activities (preference events) of Alice's friends. For example, in the last 48 hours, Alice's friends have submitted two stories, dugg twelve stories, and commented on sixteen stories, as reflected in dashboard 162. Of the twelve stories her friends have dugg, four of the stories have not yet been promoted. In some embodiments, assorted visual cues of her friends' activity are presented throughout website 116. In the example shown, stories dugg by Alice's friends are notated by a banner (184) placed across the digg score. In other cases, other cues may be used, such as by changing the color of the story, and/or interactive behavior such as playing a sound or showing the friend's avatar icon when, for example, Alice's cursor hovers over a story dugg by a friend.

Region 188 displays a list of tools, such as visualization tools, that Alice can use to view and interact with content and/or preference events.

Story Submission

Figure 2:
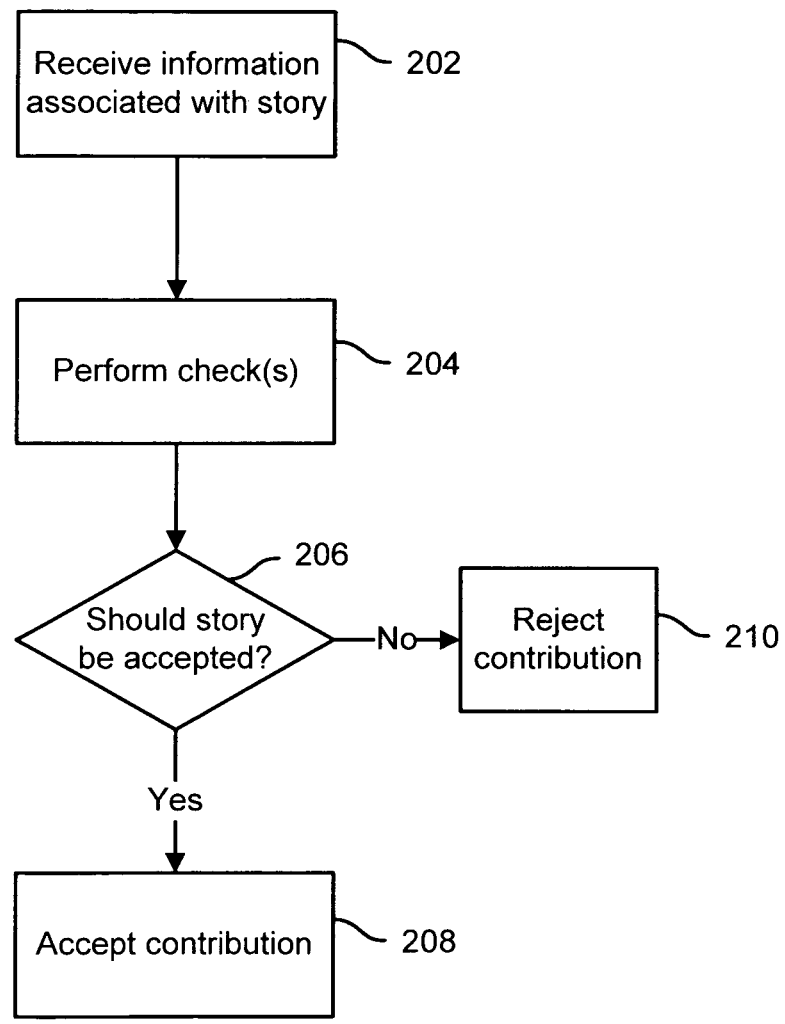
FIG. 2 is a flow chart illustrating an embodiment of a process for receiving a story submission.

FIG. 2 is a flow chart illustrating an embodiment of a process for receiving a story submission. This process may be implemented on preference server 102. In the example shown, the process begins at 202 when information associated with a story is received. For example, in some embodiments at 202, information such as the URL of a story and a summary of the story located at that URL is received.

At 204, one or more checks are performed. As described in more detail below, examples of checks include checking to make sure the URL is valid and does not, for example, contain a typo; checking for duplicate stories; determining whether the story submission appears on a blacklist or is otherwise to be blocked; determining whether the story is being submitted by a blacklisted user; determining whether the story is being submitted by an anonymous proxy, etc. At 206, it is determined whether the story should be accepted.

In some embodiments, if the story submission fails any of the checks performed at 204, the story is rejected at 210. In some embodiments, a threshold is applied to whether or not a story is accepted at 208. For example, a story that appears to be a duplicate may be flagged for review by an administrator, may be provisionally marked as a potential duplicate, may be accepted so long as no other checks are failed, etc. In some embodiments, the identity of the submitter is taken into consideration when determining whether to accept a story. The decision of whether to accept the story may be based at least in part on factors such as the length of time the user has been a registered user of site 116, whether the user has previously submitted inappropriate content, and/or a score assigned to the user.

Typically, the information received at 202 is received through a web interface, such as a story submission form that can be accessed, by selecting region 158 of interface 150. Other methods of submission may also be used, as appropriate. For example, an external website, such as a user's blog could be configured to provide an interface to server 102. Submission may also be automated, such as by syndicating a news feed to a story submission component executing the process shown in FIG. 202. As described in more detail below, submissions of the information received at 202 can also occur through the use of an application program interface (API), browser plugin, etc.

Figure 3:
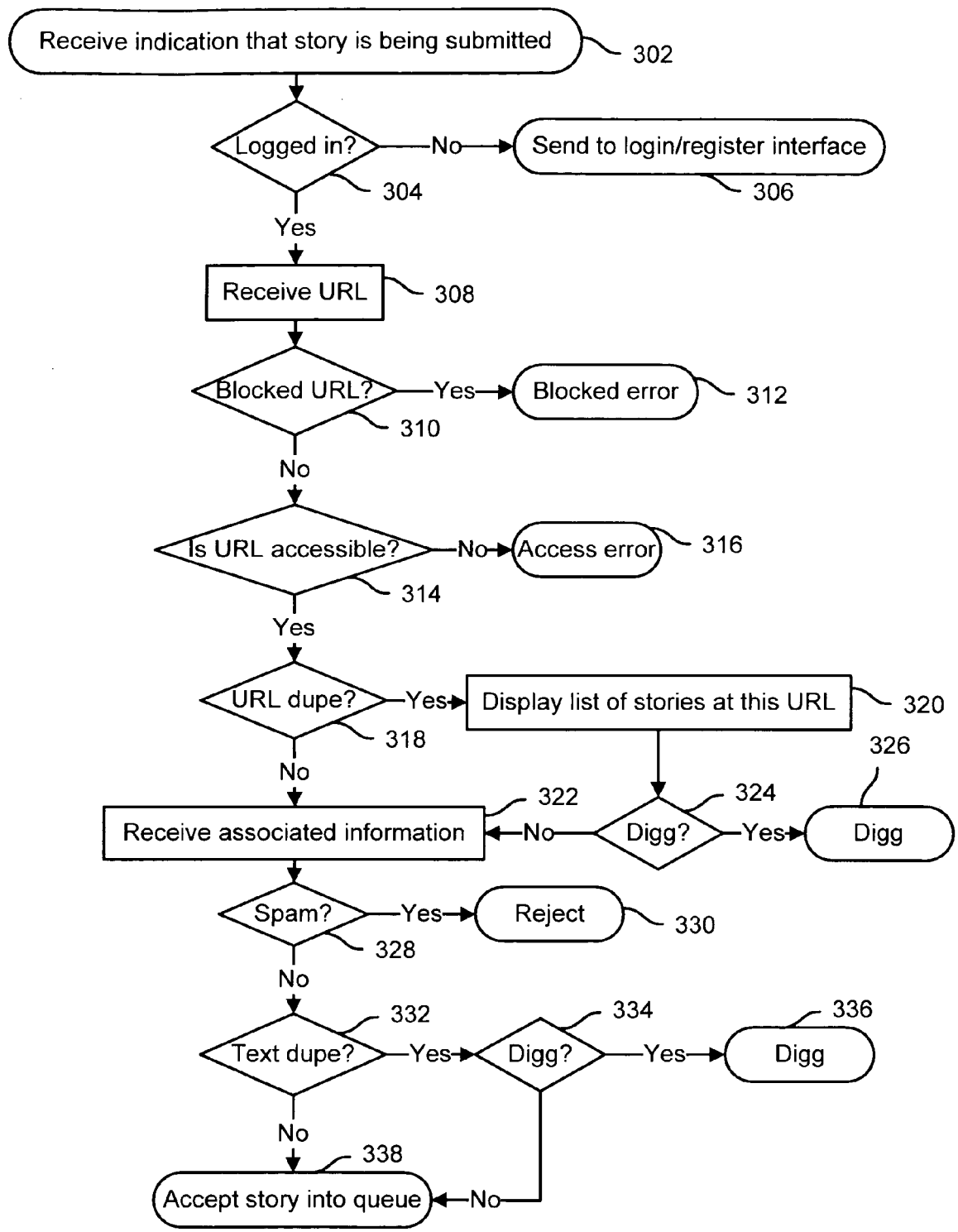
FIG. 3 is a flow chart illustrating an embodiment of a process for receiving a story submission.

FIG. 3 is a flow chart illustrating an embodiment of a process for receiving a story submission. In the example shown, the process is implemented on preference server 102 and is an example implementation of the process shown in FIG. 2. The process begins at 302 when an indication that a story is being submitted is received. Suppose Alice wishes to submit a story. When she selects region 158 of interface 150, server 102 is notified at 302.

At 304, it is determined whether the submitting user is logged into site 116. If not, the user is presented with a page at which he or she can create an account or log in to an existing account. After completing registration and/or logging in, the user is directed back to the story submission interface (not shown).

A logged in user, such as Alice, is then presented with an interface through which a story may be submitted such as a web form. At 308, a URL is received, such via Alice entering the URL into the form.

System 102 maintains a block list that includes URLs that, e.g., have been reported by administrators as spam sites, fraudulent sites, etc. If a threshold number of users report a story (such as through region 178 of interface 150), the story may be automatically added to the block list. At 310 it is determined whether the URL is present on the list of blocked URLs. In some embodiments, instead of or in addition to maintaining a list of block URLs, system 102 checks for blocked URLs in conjunction with a third party, such as a commercial anti-spam registry. If the submitted URL appears on the blocked list, the user is presented with an error at 312. In various embodiments, the error indicates to the user the problem with the URL, such as that the URL belongs to a known spammer. In such cases, the user may be presented with the option of challenging the block. In other embodiments, a user submitting a blocked URL is not told why the URL is blocked, or may not be told that the URL is blocked at all. For example, a spurious "system configuration" error may be presented to the user to help minimize attempts at circumventing checks.

At 314, it is determined whether the URL can be reached. One way of performing this check is to make use of a tool such as curl or wget. If the URL cannot be reached, for example because of a typo (e.g., HTTP Status Code 404) or because accessing the URL requires a login/password (e.g., HTTP Status Code 401), the user is presented with an error at 316. In various embodiments, the user is permitted to revise and resubmit a failed URL without having to restart the process at 302.

Duplicate checking is performed on the URL at 318. In some embodiments, the check performed looks only for exact matches of the URL. In other embodiments, fuzzy or other matching is applied.

If it is determined that the submitted URL is a duplicate of, or similar to a URL previously submitted to server 302, at 320 the user is presented with a list of the previously submitted story or stories. In some cases, the new story submission is a duplicate of an existing story submission. In other cases, however, the stories may be distinct, despite sharing a common URL. Such may be the case, for example, with a corporate website that always posts new press releases to the same URL, such as "www.company.com/news.html." Suppose Alice submits a URL that is already stored in database 112. At 320 she is asked to compare her story against the other story or stories submitted under that URL (324). For example, the interface may present to her a list of the existing stories matching her submitted URL in a format similar to story window 164 shown in FIG. 1B. If the story she wishes to submit has already been submitted, she can digg the existing story (326), rather than submitting a duplicate. If her story is not a duplicate, she can continue with the submission. In various embodiments, considerations such as the sophistication of the user determine whether an exact duplicate URL will be permitted or whether the user will be forced to digg one of the stories presented on the duplicate list instead of submitting the new story submission.

At 322, the user is prompted to supply additional information about the story submission, such as the story's title, a summary of the story, and to which category or categories it belongs. In some embodiments, the information collected at 322 is received at the same time that the URL is received (308) and portion 322 of the process shown in FIG. 3 is omitted.

At 328, additional checks are performed on the story. For example, a spam story may escape detection at 310. Such may be the case if the spam was recently created or is an attempt to unscrupulously drive traffic to a previously legitimate page and is not already present in a blacklist. One check that can be performed at 328 includes applying spam detection techniques to the text located at the submitted URL and/or the title or summary provided by the user. Additional checks may also be employed in addition to or instead of spam checks at 328. For example, a determination may be made of whether the submitter (e.g., Alice) is connecting to site 116 via an anonymous proxy. If it is determined at 328 that the submission is spam or should otherwise not be accepted, at 330, the submission is rejected. In some embodiments, the submission is "silently" rejected—the user is shown a "successful" dialogue when in fact the story is rejected. In other embodiments, the user is presented with an error, such as the error presented at 312.

Additional duplication checks are performed on the story at 332. In some embodiments, the submitted title and summary of the story are compared against the titles and summaries of stories already submitted to server 102. In some embodiments, the page is crawled and a full text match (such as a MySQL full text search) is performed against the submitted story and previously submitted stories. In such a case, database 112 is configured to store at least portions of the crawls in addition to information associated with the story. If it is determined that the story is a potential duplicate, at 334 the user is presented the option of digging the story (336) or submitting it anyway.

When a story is accepted at 338, an entry for the story submission is created in database 112. Information such as the submission time and the user who submitted the story are stored and counts associated with the story, such as its digg score, are set to zero. The story becomes accessible in the upcoming stories view (e.g., 186 of FIG. 1B).

Information in one or more tables 114 is also updated to include information associated with the new story, for example for use in conjunction with searching, and with visualizations discussed in more detail below. Additionally, information associated with the submitting user is modified as appropriate. For example, a count of the number of stories submitted by the user is incremented, and the story is made available in areas such as the user's profile and the profile areas of the user's friends, if applicable.

As described in more detail below, a permalink for the story can be accessed by visitors to site 116 and contains content assembled dynamically from the information stored in database 112. In system 102, the permalink's URL is created by stripping disallowed characters (such as punctuation) from the submitted story's title and appending digits as necessary to avoid collisions. So, for example, if Alice's submitted story were titled "New Species of Bird Discovered," once accepted at 338, information associated with the submitted story would be accessible at the URL, "http://www.digg.com/science/New_Species_of_Bird_Discovered.html."

Also at 338, if the user has specified blogging information, such as a username and password of an account on a blogging service, the submitted story is posted to the user's blog. Information such as the summary and/or title of the story can be automatically copied into the blog submission and/or edited by the user prior to submission. For example, if Alice has specified the details of her blog account in her profile (reachable by selecting portion 154 of interface 150), when submitting story submissions, she can specify whether she'd like the story to also appear in her blog. If Alice has not configured her blog settings, the ability to blog can be greyed out, hidden, and or explained at 338, as applicable.

Recording and Reflecting Preference Events

Figure 4:
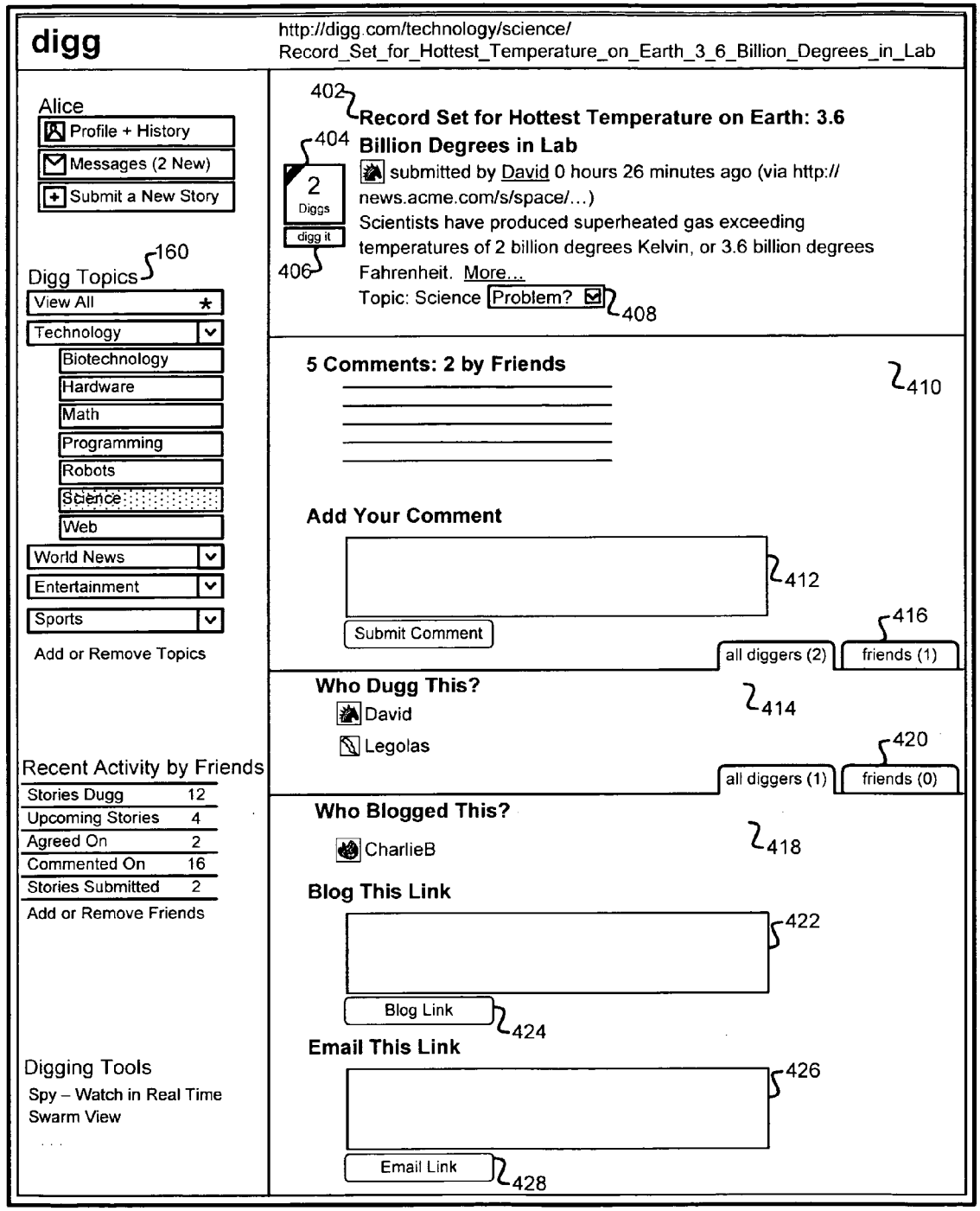
FIG. 4 illustrates an embodiment of a story permalink.

FIG. 4 illustrates an embodiment of a story permalink. The example shown is an implementation of a portion of website 116 as rendered in a browser. Story 402 was recently submitted to server 102 (26 minutes ago), through the process depicted in FIG. 2. When Alice visits the permalink of story 402, topic region 160 of sidebar 152 automatically expands and highlights the topic with which story 402 is associated (in this case, "Science"). The story was submitted by David, who also dugg the story. Alice has David listed under her profile as her friend. As a result, the digg count includes a visual indication 404 that story 402 was dugg by a friend. In some cases, Alice and David know each other and have each other, mutually, on their list of friends. In other cases, the relation may be one sided. For example, David may be a columnist or famous personality whose opinion Alice values.

The digg score of story 402 is currently two (404) and the story has not met the threshold(s) required for the story to be promoted out of the "upcoming stories" area.

In the interface shown in FIG. 4, Alice can click digg box 406 to indicate her preference for the story. In some embodiments, additional actions are taken when Alice diggs a story. For example, if she has configured her blog settings, Alice can specify that stories that she diggs be posted to her blog as she diggs them. Similarly, Alice can configure her personal website (e.g., with a JavaScript) to automatically syndicate recent activities taken in response to stories.

She can report a problem with the story (bury it) by selecting an option from problem dropdown 408. Story reporting options include "duplicate" story (to report that story 402 is a duplicate of another story), "bad link" (to report that the link to the full text of the story is defective), "spam" (to indicate that the story is fraudulent or spam), "inaccurate" (to indicate that there are factual problems with the story), and "old news" and "this is lame" to indicate that the story is not newsworthy. In some embodiments, bury events are anonymous site wide and are not replicated, for example, in a user's publicly accessibly digging history. One reason for this is to minimize the chances of a "flame war" occurring, for example, when a well known user negatively rates a story or comment.

As described in more detail below, region 410 displays comments that users have made about story 402. Thus far, a total of five comments have been left about story 402, two of which were left by Alice's friends. Alice can submit comments by entering information into region 412 of FIG. 4.

In region 414, Alice is currently viewing a list of all the users who dugg story 402. Suppose David is Alice's friend, but Legolas is not. If Alice selects friends tab 416, the view in region 414 will change to show only David's name and avatar icon.

In region 418, Alice is currently viewing a list of the users who have blogged story 402. Charlie is the only person who has blogged the story so far and he is not Alice's friend. Therefore, if Alice were to select friends tab 420, no names would be shown.

Alice can submit this story to her own blog by entering in optional text in region 422 and selecting region 424. Alice can email the story to one or more addresses by entering them into region 426 and selecting region 428.

As shown, all of the information associated with a particular story (e.g., title/summary of the story, digg score, comments, who has blogged the story, etc.) is displayed on a single page. In other embodiments, the information is presented across multiple pages, such as with a tabbed view with one or more tabs for each component.

FIG. 5 illustrates an embodiment of an interface to a preference system. The example shown is an implementation of portion 410 of website 116, as rendered in a browser. In the example shown, Alice is viewing comments associated with a story. The story currently has eight comments (502), sorted by date. A threshold of −4 diggs or higher has also been applied (518). Thus, comment 516, which has been buried 75 times, is hidden. In the example shown, only the header of a buried comment is displayed, along with a link to reveal the hidden comment (522). Additionally, the header of comment 516 is greyed out to help a user visually distinguish between buried and nonburied comments.

Comment 504 was written by Bob, one of Alice's friends, as was comment 506 (written by David). In this example, comments written by friends are distinguished from other comments, such as through having a differently colored header. Comments dugg by friends are also distinguished. Thus, while CharlieB is not Alice's friend, his comment (508) is distinguished because it was dugg by Bob, who is Alice's friend, as also indicated by the inclusion of Bob's name and a star on the header of comment 508. The number of comments left by and/or dugg by her friends are indicated at 514.

In the example shown, Bob has written an informative comment, which 18 people have dugg. If desired, Alice can digg or bury Bob's comment by selecting the appropriate icon at 520. In the example shown, the digg icon is a green thumb pointing up. The bury icon is a red thumb pointing down. As described in more detail below, if Alice selects one of the icons, Bob's comment score is immediately updated and the thumbs are greyed out to indicate to Alice that she's already registered her preference for Bob's comment.

Suppose Alice finds comment 510 to be off topic or otherwise unhelpful. If she chooses to bury the comment, in the example shown, a variety of changes will occur in the interface immediately. The comment score for comment 510 will decrement by one point. Additionally, comment 510 will collapse down to just the header, which will grey out. If Alice finds the poster of the comment, Legolas, a sufficient nuisance, she can block him by selecting block icon 524. In this example, if Alice selects the block icon, she will never be shown any content from Legolas again, site-wide, unless she later chooses to unblock him, such as through settings in her profile. Thus, by selecting block icon 524, Alice will not see comments made by Legolas, stories posted by Legolas, etc., unless and until she chooses to unblock him.

In some embodiments, if enough people bury a comment, the comment is removed from the site and/or reported to an administrator. Similarly, if enough people block a user, in some embodiments, the user is reported to an administrator and/or banned from accessing site features.

If desired, Alice can submit one or more comments of her own. For example, she may reply to an existing comment by selecting the reply button associated with the comment (526), or create a new comment by submitting text through region 528. In some embodiments, Alice is given a portion of time during which she may edit the comment, such as within five minutes of submitting the comment.

As described in more detail below, when Alice submits or diggs a comment, that preference event is recorded in database 112, her profile and the profiles of her friends are immediately updated, and associated RSS files are updated.

Figure 6:
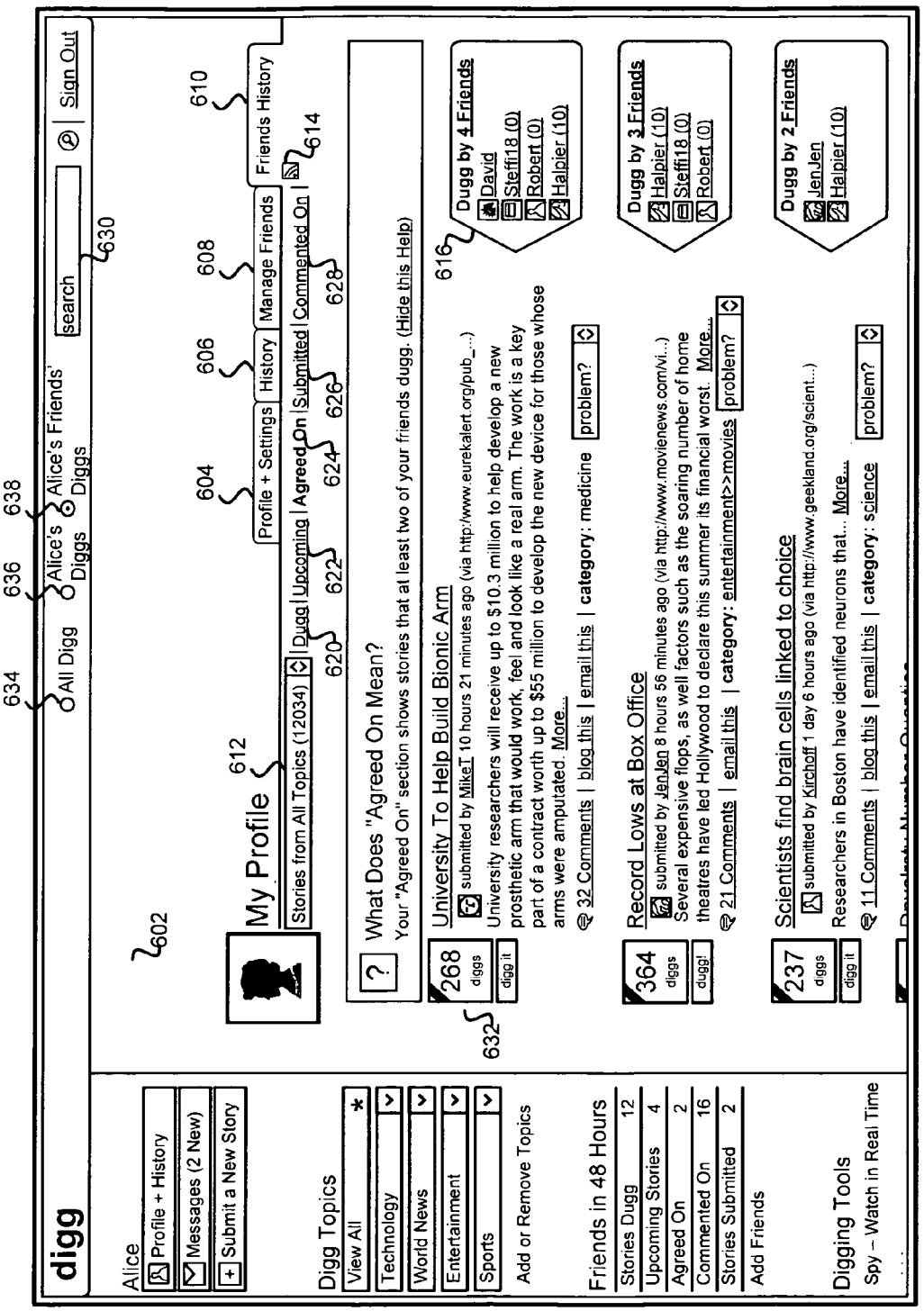
FIG. 6 illustrates an embodiment of an interface to a preference system.

FIG. 6 illustrates an embodiment of an interface to a preference system. The example shown is an implementation of a portion of website 116 reached by selecting region 154, as rendered in a browser. In this example, Alice is viewing her profile (hereinafter "interface 602"), which has been subdivided into several tabbed views (604-610). A profile provides access to a variety of information, some of which may be publicly viewable, and some of which may be kept private. For example, Alice can change account settings such as specifying her email address and password by selecting portion 604 of interface 602. Visitors to Alice's profile will be presented with a subset of the information available to Alice. For example, while Alice sees tab 604 being labeled "Profile+ Settings," a visitor to Alice's profile would see tab 604 as leading to Alice's "Profile" only. Similarly, tab 608, which by selecting allows Alice to add and remove friends, is only available to Alice and is hidden from visitors to her profile. Alice can also add friends by visiting other users' profiles and selecting an "add this user as my friend" option located in the profile.

Alice has currently selected to view her friends' history by selecting portion 610 of interface 602. The information presented can be further customized by selecting from subsets of information. For example, if Alice selects portion 620 of interface 602, she will be presented with a listing of all of the stories that have been dugg by at least one of her friends. If she selects portion 622, she will be presented with a list of stories that have been dugg by at least one of her friends but have not yet been promoted. If she selects portion 626, Alice will be presented with a list of stories submitted by her friends, and by selecting portion 628, Alice will be presented with a list of stories that have been commented on by her friends. Other information (not shown) may also be presented in other embodiments, such as a list of comments that Alice and/or her friends have dugg.

In the example shown, Alice has selected to view stories "agreed on" by her friends (624). Each of the stories listed in this view have been dugg by at least three of Alice's friends. In various embodiments, Alice can configure the threshold and specify such information as the number of friends (or total number of diggs) required for a story to be agreed upon and/or define particular individuals whose digg is necessary for a story to be considered agreed upon, keywords that must be present in the story, etc. By making use of the "agreed on" view, Alice can readily discern the most important stories, even if she has thousands of friends. (I.e., if she sets the threshold to "agreed on by at least 10 friends," and has 1000 friends, the number of stories she is presented with is likely to be manageable and especially relevant or interesting.)

Region 616 of interface 602 indicates that four of Alice's friends have dugg story 632. Alice can also see which of her friends have dugg story 632 by hovering her input device over the digg score box of story 632. In some embodiments, Alice can interact with region 616, such as by being presented with a dialogue that offers to send an email to all of her friends listed in the region.

By selecting portion 606 of interface 602, both Alice, and visitors to Alice's profile will be presented with Alice's history in a format similar to that currently shown, but limited to activities taken by Alice. Additionally, Alice may "undigg" stories and comments that she previously dugg by visiting her history.

All of the views described in conjunction with FIG. 6, such as stories "Agreed On" by Alice's friends can by syndicated as RSS feeds by selecting RSS link 614 on the appropriate page view. In some embodiments, profile visitors (including Alice) are presented with the option to search (630) all of site 116 for content (634), search Alice's diggs for content (636) and/or search diggs made by Alice's friends for content (638).

When a user takes certain actions, such as digging a story or burying a comment, the results of that action are reflected immediately, without the user being directed to a "success" page or the appearance of, e.g., a page refresh occurring to the user. For example, suppose Bob has listed Alice as his friend. Whenever Alice submits a new story, that new story immediately appears on Bob's "Friends—Submitted" list and is written to the associated RSS file. Similarly, whenever David comments on an article, that fact is immediately reflected under Alice's tab 628 as shown in FIG. 6. As described herein, pages served by web module 108 include Asynchronous JavaScript and XML (Ajax) components. Other techniques may also be used to dynamically update site 116 as rendered in a browser as appropriate.

Figure 7:
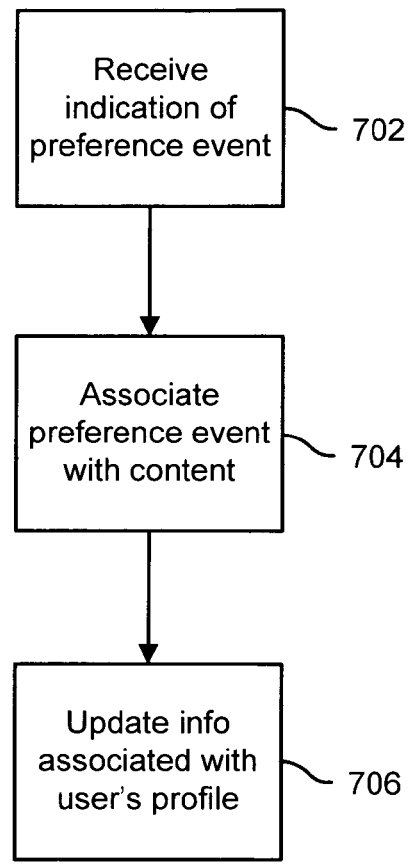
FIG. 7 is a flow chart illustrating an embodiment of a process for recording a preference for a content contribution.

FIG. 7 is a flow chart illustrating an embodiment of a process for recording a preference for a content contribution. The process begins at 702 when an indication that a preference event has occurred is received. For example, when Alice selects digg box 406 shown in FIG. 4, her preference is received at 702. Other examples of preference events include submitting a story, burying a story, and commenting on a story. At 704, the preference event is associated with the content contribution and any associated scores are updated as applicable. For example, at 704, Alice and story 402 are linked in database 112 and the digg score of story 402 is increased in database 112 from two to three. At 706, information associated with the user's profile is updated. For example, as described in more detail in conjunction with FIG. 6, views of Alice's digging history (including the friends views of users who have listed Alice as a friend) are updated to include the dugg story and an indication that Alice dugg it. Any RSS files associated with her profile and the profiles of those who have her listed as a friend will also be updated as appropriate.

Visualizations

Figure 8A:
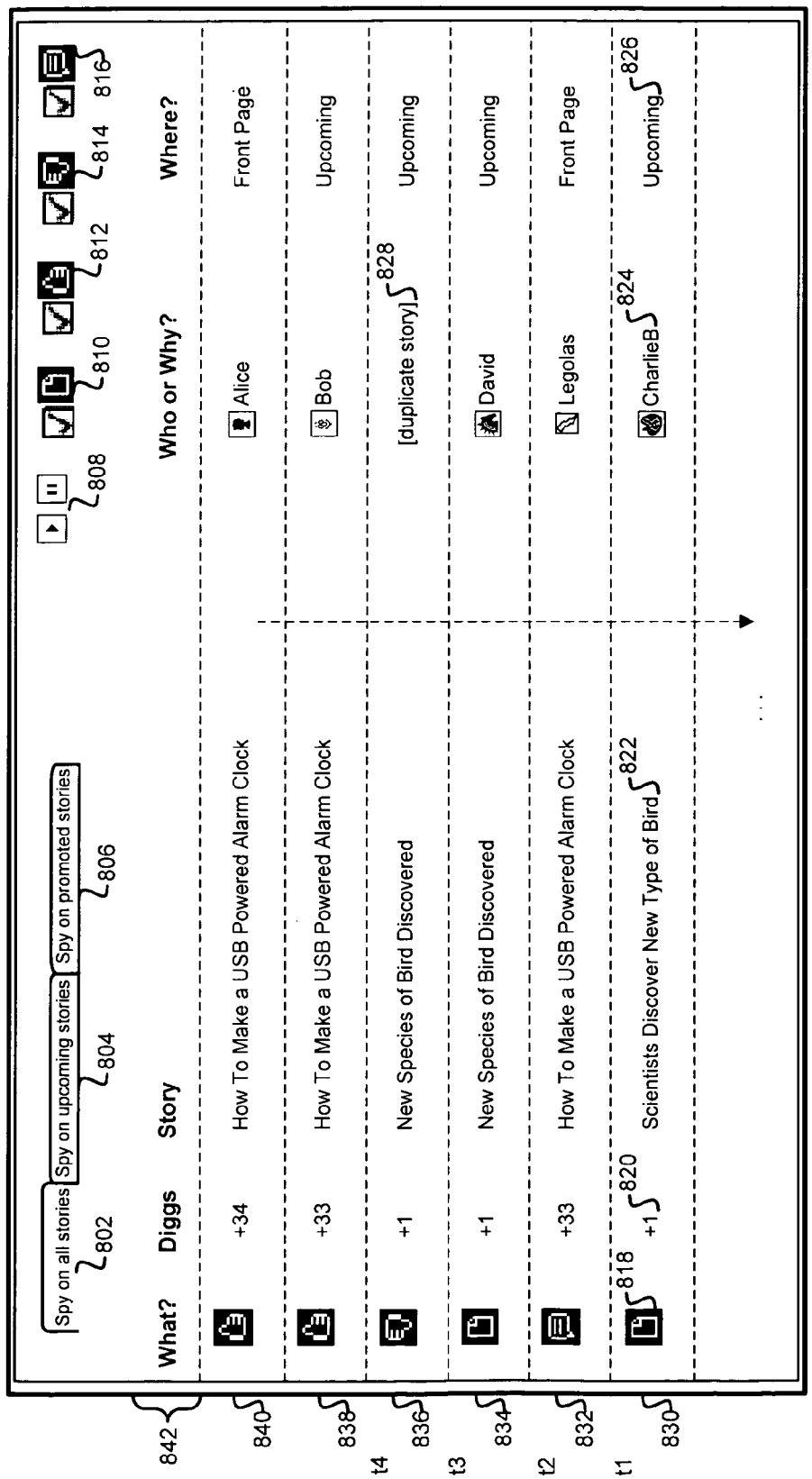
FIG. 8A illustrates an embodiment of a visualization interface.

FIG. 8A illustrates an embodiment of a visualization interface. The example shown is an implementation of a portion of website 116 as rendered in a browser. In this example, interface 800 (also referred to herein as the digg "spy" interface and a "ticker" interface) is configured to present a real time visualization of preference events occurring on preference system 102.

In the example shown, a user such as Alice can specify which stories to spy on. For example, she can spy on all stories (802), stories which have not yet been promoted (804), or just promoted stories (806). Further specification of a subset of stories can also be applied, as applicable. For example, in various embodiments, a user can specify a key word that must be present in all stories being spied upon, and/or spy on stories in specified categories (not shown), and/or spy on events taken by friends only.

Additionally, a user can specify the types of preference events to be spied upon. In the example shown, Alice has checked (would like to see) all types of activity—new story submissions (indicated by icon 810), diggs (indicated by icon 812), buries (indicated by icon 814), and comments (indicated by icon 816).

One way of implementing the visualization shown in FIG. 8A is as follows. As a preference event occurs, it is recorded in database 112. Maintained within database 112 are a main database table and four smaller tables 114—one for each type of event. The event is also recorded (either concurrently with, or on a periodic basis such as by way of an update function) in the respective smaller table that corresponds with the event. In some embodiments, filtering is applied so that, for example, only commenting of registered users is recorded in the comment table but all commenting is recorded in the main table. A flag in the main database (e.g., a "do not report this to spy" flag) can also be set that indicates whether information associated with a particular story or user should be copied to the smaller tables 114. Alice is a typical user whose diggs are recorded in the main database table, as well as the smaller table that records only diggs.

When Alice first visits interface 800 with her browser, and on a recurring basis after that (such as every 20 seconds, or whenever the pool of events is running low), batches of information are retrieved from server 102 in a scope commensurate with the options selected (which documents to spy on and for which activities). Specifically, the most recent content from each of the smaller tables 114 is retrieved from server 102 and stored locally, such as in Alice's browser. Asynchronous JavaScript and XML (Ajax) components in interface 800 cause the information to displayed to Alice, for example, at a rate of one event per second, depending on which information she would like to view. In some embodiments, Alice can control the speed of the display, such as through playback controls 808.

In some cases, such as with heavy digging activity, there may be sufficiently more than 20 diggs occurring site-wide during the twenty second interval between the times that Alice's browser fetches a new batch of digging information. Thus, after twenty seconds have elapsed, system 102 may have recorded 200 digg events—significantly more than the 20 digg events that Alice periodically fetches. In some embodiments, only the most recent 20 actions are fetched. Thus, every twenty seconds, Alice requests the 20 most recent events and will never see any intervening events.

In other embodiments, the number of events fetched adjusts in accordance with the speed with which the events are occurring. In such case, all of the events are fetched and the rate with which they are displayed is sped up (showing one every tenth of a second if there are 200) or slowed down (showing one every five seconds if there are only four) as appropriate. In some embodiments, a sampling of activity is taken throughout the period so that if 200 events occur during the 20 second interval, a random sample of 20 will be supplied to Alice's browser.

In the example shown in FIG. 8A, Alice has been viewing interface 800 for six seconds. Six events (830-840) are displayed, with the mot recent (840) displayed at the top. As a new event is displayed, the already displayed events are pushed down the display. Thus, for example, at time t1 (when Alice first began watching the interface), only event 830 was presented. At time t2 (one second later), event 832 was displayed above event 830, pushing event 830 down the screen. At time t3 (one second after time t2), event 834 was displayed, pushing events 832 and 830 each down one position, respectively.

By consulting the column descriptions (842), Alice can see that event 830 was a submission of a new story (818), titled "Scientists Discover New Type of Bird" (822), that the story was submitted by CharlieB (824)), and that the story is currently unpromoted (826) with a digg score of 1 (820). When event 832 appears in the display at time t2, Alice can see that event 832 was a comment by Legolas on a story titled "How to Make a USB Powered Alarm Clock" that currently has a digg score of 33 and has been promoted out of the upcoming stories queue. At time t3, Alice can see that David posted a new story titled "New Species of Bird Discovered." At time t4, David's story was reported as being a duplicate story (828). The identity of a user burying something is not shown. Instead, only the reason for the bury (such as duplicate-story, inaccurate story, old news, etc.) is shown. In other embodiments, other information can be displayed, as applicable.

In FIG. 8A, the displayed digg count for a story is shown as what it was at the time the event occurred. Thus, when event 838 (a digg of "How to Make a tjSB Powered Alarm Clock" by Bob) occurs, the digg count of the story is shown as 33. The next time the story is dugg, the updated score is shown, such as when event 840 occurs. If the digg events are happening sufficiently quickly that some of them are not displayed to Alice, she might see gaps between the scores. For example, if 50 diggs of the alarm clock story occur in the next few seconds, Alice may only be presented with the most recent digg and the updated total (e.g., 83 diggs).

Figure 8B:
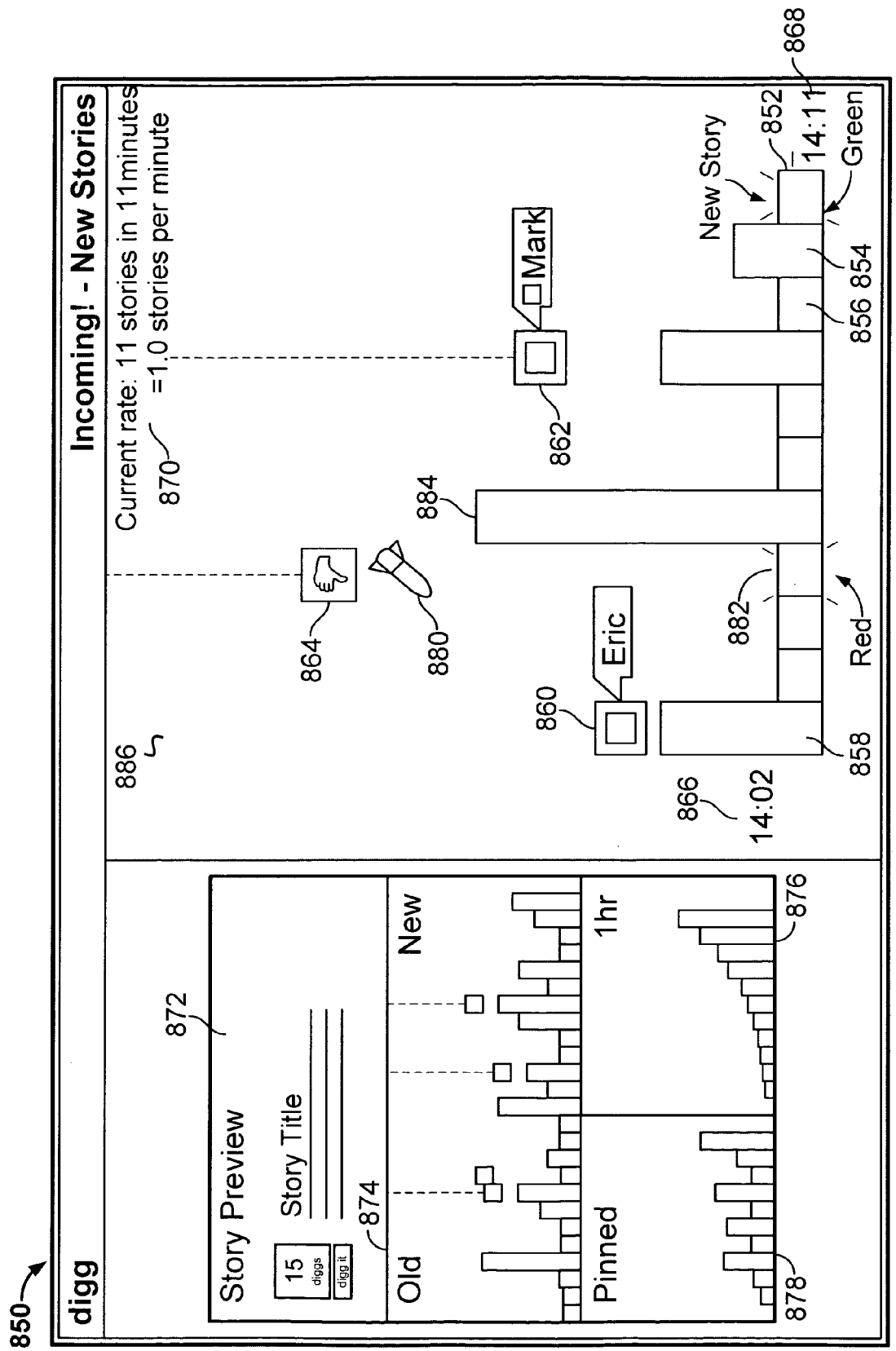
FIG. 8B illustrates an embodiment of a visualization interface.

FIG. 8B illustrates an embodiment of a visualization interface. The example shown is an implementation of a portion of website 116 as rendered in a browser being used by Alice. In this example, interface 850 is configured to present a visualization of newly submitted stories. After a new story is submitted, such as through the submission interface described in conjunction with FIG. 3, it is represented in interface 850 as a green square falling from the top of the screen, and landing at the bottom. Any stories already existing on the page (e.g., 858, 882, 856, and 854) are shifted to the left to make room for the new story (852). In some embodiments, stories are removed from the left side to make space for stories on the right side. In other cases, the width of the stories shown decreases to accommodate more stories as they are added to the interface. The length of time that a user has been viewing interface 850 is shown here as a timeline, with the time that Alice first started viewing interface 850 on the left (866) and the current time on the right (868).

In the example shown, eleven new stories have been submitted since Alice began viewing interface 150. Statistical information such as the number of stories submitted, the rate with which they are being submitted, etc., is indicated at 870. As preference events associated with the stories displayed in interface 850 occur, they are also indicated in interface 850. For example, when a story is dugg, the event is represented by a digg icon, such as the one shown at 812 in FIG. 8A falling from the top of the screen and onto the heap of the corresponding story, increasing the size of the heap if it is a digg, and decreasing the size of the heap if it is a bury. For example, at 860, a digg of story 858 is shown falling down onto the story's graphical representation and will increase the height of the story box when it lands. A variety of indicators, such as colors and avatars can be used to indicate the occurrence of preference events in addition to or instead of the icons shown in FIG. 8A.

At 864, a bury of story 882 is shown falling down onto that story's graphical representation and will decrease the height of the story box when it lands. In the example shown, the bury is indicated by the bury icon shown at 814 in FIG. 8A. The identity of the user burying the story is not shown (as it can be in the case of other preference events), but by hovering her mouse over bury 864, Alice is shown a dialogue that includes the reason that the bury was submitted (e.g., "spam").

In some embodiments, additional elements are included, such as the animation shown at 880 (of a missile about to strike heap 882), and indications of who is taking the action.

For example, diggs 860 and 862 are being performed by friends of Alice. She is alerted to this fact by bubbles accompanying the digg action being performed that indicate their names and/or avatars. The look of interface 850 can be skinned in some embodiments—Alice can specify that she desires the interface to have a militaristic theme, such as in the example shown, or other themes, such as ones in which animals "eat" stories or multiply.

The relative popularity of newly submitted stories is indicated by the relative heights of the stories shown in interface 850. For example, story 884 is a very popular story, while story 856 is not.

In the example shown, only newly submitted stories are shown. Interface 850 can also be scoped to represent other portions of activity. For example, Alice can specify that she wants to observe only actions taken by her friends (or groups of her friends), but across all stories, new or old. Alice can also specify that she wants to observe only actions that include a particular keyword, actions occurring only in particular categories or subcategories, etc. Alice can also specify particular stories she wishes to monitor, such as by selecting a link on the page's permalink that reads, "add this story to my incoming view." Alice can also "pin" the stories shown in interface 850. When she hovers her mouse over a particular story shown in interface 850, one element that is revealed is a pushpin icon which, if selected, causes the story to remain in region 886 of interface 850, and/or be added to a list of favorites (878).

A variety of graphical tools are shown on the left hand side of interface 850. They include charts of information such as which stories in the last hour have been most popular 876, the relative rankings of stories that Alice is monitoring (has pinned) 878, a more comprehensive view (i.e., including information predating Alice's current interactions with interface 850), etc. At 872, the story entry 170 of a story that Alice hovers her mouse over, such as story 854, is displayed and she can interact with the story entry 170 such as digging it or burying it accordingly.

Figure 9:
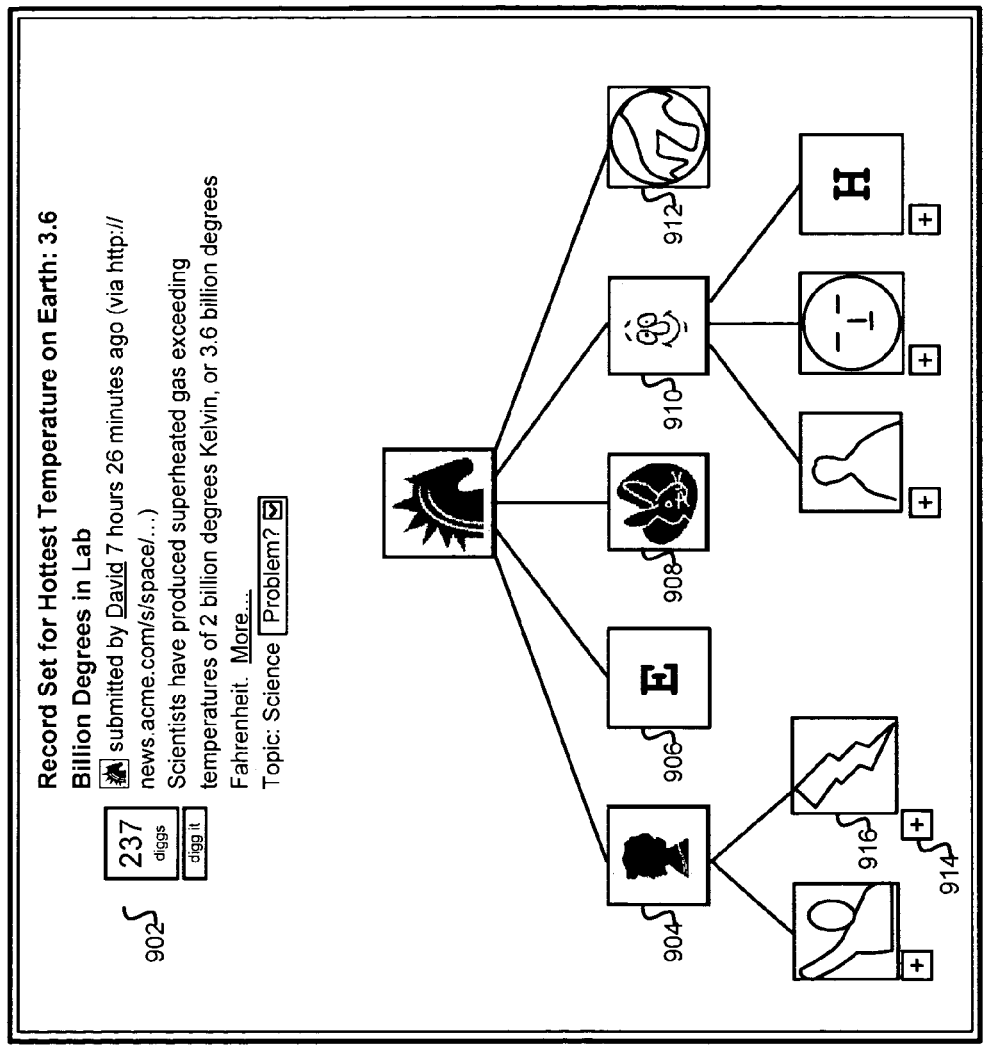
FIG. 9 illustrates an embodiment of a visualization interface.

FIG. 9 illustrates an embodiment of a visualization interface. The example shown is an implementation of a portion of website 116 as rendered in a browser. In this example, interface 900 is configured to present a visualization of the genealogy of the diggs (also referred to herein as a "tree view") of a story on preference system 102.

In the example shown, story 902 was originally submitted by the user David. When he successfully submitted the story, it appeared in his profile, as well as in the Friends History (e.g., at 610 of FIG. 6) of the several people who have listed David as their friend. Suppose ten people have David as a friend, including users 904, 908, and 912 and seven users not pictured. After David submitted the story, friends 904, 908, and 912 dugg story 902, either through their own friends pages, or through David's profile. They are displayed in interface 900 as connected to David. Users who have David listed as a friend who did not digg the story are not displayed in interface 900. Users 906 and 910 do not have David as a friend, but dugg the story through visiting his profile. As a result, they are also shown connected to David.

When users 904-912 dugg story 902, that action was recorded in their respective user profiles as well. Visitors to their profiles, and those who list them as friends who digg the story will be shown connected to them, the way they are shown connected to David. If expansion tab 914 is selected, interface 900 will continue to provide detail down the tree (those who dugg story 902 through user 916, and so on).

One use of the tree view is that users can trace how their friends learned about stories and meet new friends. For example, if Alice notices that Bob diggs a lot of cryptography stories, she can determine where Bob diggs them from—does he submit the stories himself, or is he mainly digging stories submitted by CharlieB—and add new friends (such as CharlieB) as appropriate.

FIG. 10 illustrates an embodiment of a visualization interface. The example shown is an implementation of a portion of website 116 reached by selecting region 186 of FIG. 1B as rendered in a browser. In this example, Alice is viewing upcoming stories, which may be displayed in a variety of ways. If she selects region 902, Alice will be presented with upcoming stories in a format similar to that shown in the story window 164 shown in FIG. 1B (including one or more story entries 170).

In the example shown, Alice has selected to view the upcoming stories in a cloud view by selecting tab 904. In this view, the title of each story in the upcoming queue is visualized as a function of the number of diggs it has. Stories with few diggs are shown in a very small font, and may be colored in a subtle manner, such as by being displayed in grey. Stories with many diggs are shown in a very large font and may be displayed in another color, such as red or black. Stories dugg by friends are also shown in a different color, such as green, irrespective of number of diggs. In some embodiments, additional information is received from the interface shown in FIG. 10 by taking an action such as hovering a mouse over a story title. In such case, information such as the current digg score of the story, which if any friends have dugg the story, and/or the story entry 170 of FIG. 1B is shown.

Which stories will appear in the cloud view can be configured, such as by selecting one or more categories to view or limiting the view to stories dugg by friends. The cloud view can also be sorted by a variety of factors. As shown, the newest (most recently submitted) stories are shown at the top, and older stories are shown at the bottom of FIG. 10. If the stories were sorted by most diggs, then stories rendered in the largest font would appear first and stories rendered in the smallest font would appear last. Other sorting methods may also be used, such as by sorting by most or least comments.

FIG. 11 illustrates an embodiment of a visualization interface. The example shown is an implementation of a portion of website 116 reached by selecting the appropriate portion of region 188 of FIG. 1B as rendered in a browser. In this example, Alice is viewing upcoming stories. Users are shown represented by their avatar icons, or by more generalized shapes. As they digg a story, their icon is shown "swarming" around the story in real time—the avatar moves near the story the user is digging, as do the avatars of the other users currently digging the story. In some embodiments, the size of the user's avatar (or other representation of the user) increases and decreases based on the number of stories they are currently digging.

In some embodiments, only recent activity is shown—such as diggs in the last 10 minutes. Stories with more activities (such as diggs and comments) will appear larger than stories with fewer activities. In some embodiments, additional information is received from the interface shown in FIG. 11 by taking an action, such as hovering a mouse over a story title. In such case, information such as the current digg score of the story, which, if any friends have dugg the story, and/or the story entry 170 of FIG. 1B is shown. The links between stories can also be shown, indicating, for example, that several of the same people that dugg a particular first story also dugg a second story, by connecting the two stories with a line. Indicators such as the color or width of the line can show how strong or weak the connection is between the stories.

Additional Embodiments

In some embodiments, a plugin and/or add-on to a computer program product is used to provide digging (and/or burying, commenting, and submitting) functionality. The plugin/add-on is associated with an interface to server 102 which may include functions that determine whether a permalink already exists for the submission, and invoke processing of a new submission, a comment, etc., as appropriate.

For example, a plugin to a web browser (e.g., a Firefox extension) can be configured to offer a user the ability to digg an item directly from the context in which it is encountered without having to visit the submission interface described in conjunction with FIG. 3 or a permalink such as the one shown in FIG. 4. For example, a notification embedded in a page or overlayed such as by the browser can indicate whether the page a user is currently browsing has been submitted as a story contribution yet. If not, a user can interact with the notification, such as by clicking on an interface that reads, "this page has not yet been submitted to digg.com, submit it now." Similarly, if the page has already been submitted, such as by a different user, the notification may take a variety of forms, such as an overlay of the current digg score (172) and a digg box, or a change, for example, in the background color, or some other element of the page.

Configurable dropdowns and/or overlays can also be provided to alert a user of certain activity. For example, the user can set an alert to receive notification when new stories having certain keywords are submitted to server 102. Notification can also be provided for friends' digging activities as they occur, such as that a friend has just dugg a story or commented on a product.

As used herein, content contributions are pointers to content (e.g., news articles and podcasts) that is stored outside of preference system 102, typically by a third party. In some embodiments, users submit the content itself (e.g. the full text of articles, and the audio file) rather than or in addition to a pointer to the content, and the techniques described herein are adapted accordingly. The terms "content," "content contribution," and "pointers to content" are used herein interchangeably. As described in more detail below, content contributions are not limited to news articles. Other content (such as products, services, songs, sounds, photographs, and video) can be submitted, dugg, buried, and commented on and the techniques described herein can be adapted as appropriate. Preference events taken on those types of content may likewise be associated with a profile and shared with friends in a manner similar to that described, for example, in conjunction with FIG. 6.

Figures 12A, 12C:
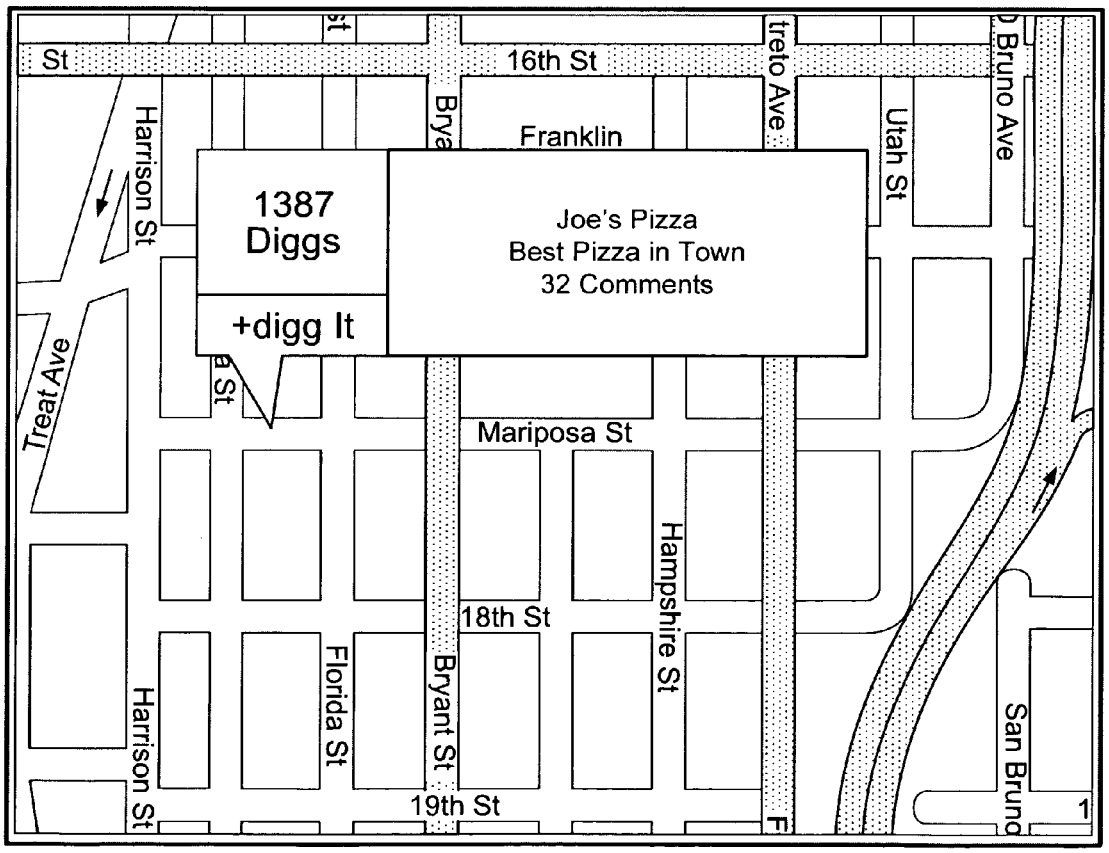
FIG. 12A is an example of a content contribution.
FIG. 12C illustrates an embodiment of an interface to a preference system.

FIG. 12A is an example of a content contribution. The example shown represents a restaurant submission. The name of the restaurant (1200) is included, as is information such as who submitted the restaurant, the URL of the restaurant, the type of cuisine it serves (1202), and the general location of the restaurant (1204). Users may perform such actions as searching for restaurants by cuisine type and/or location, and limiting results to ones having a threshold number of diggs. Restaurants having no or few diggs can be displayed as "upcoming restaurants," separated from "promoted restaurants" which have digg scores exceeding a threshold. Users can also supply additional information about their preferences for the reference, such as by supplying one or more tags (1202) that indicate attributes such as "ambiance" or signature dishes. As described in more detail below, which fields/tags are collected at submission time (and which, if any, can be added subsequently) and shown can be configured as appropriate depending on the type of content. For example, in the case of a product, a stock photo of the product may be included.

Figure 12B:
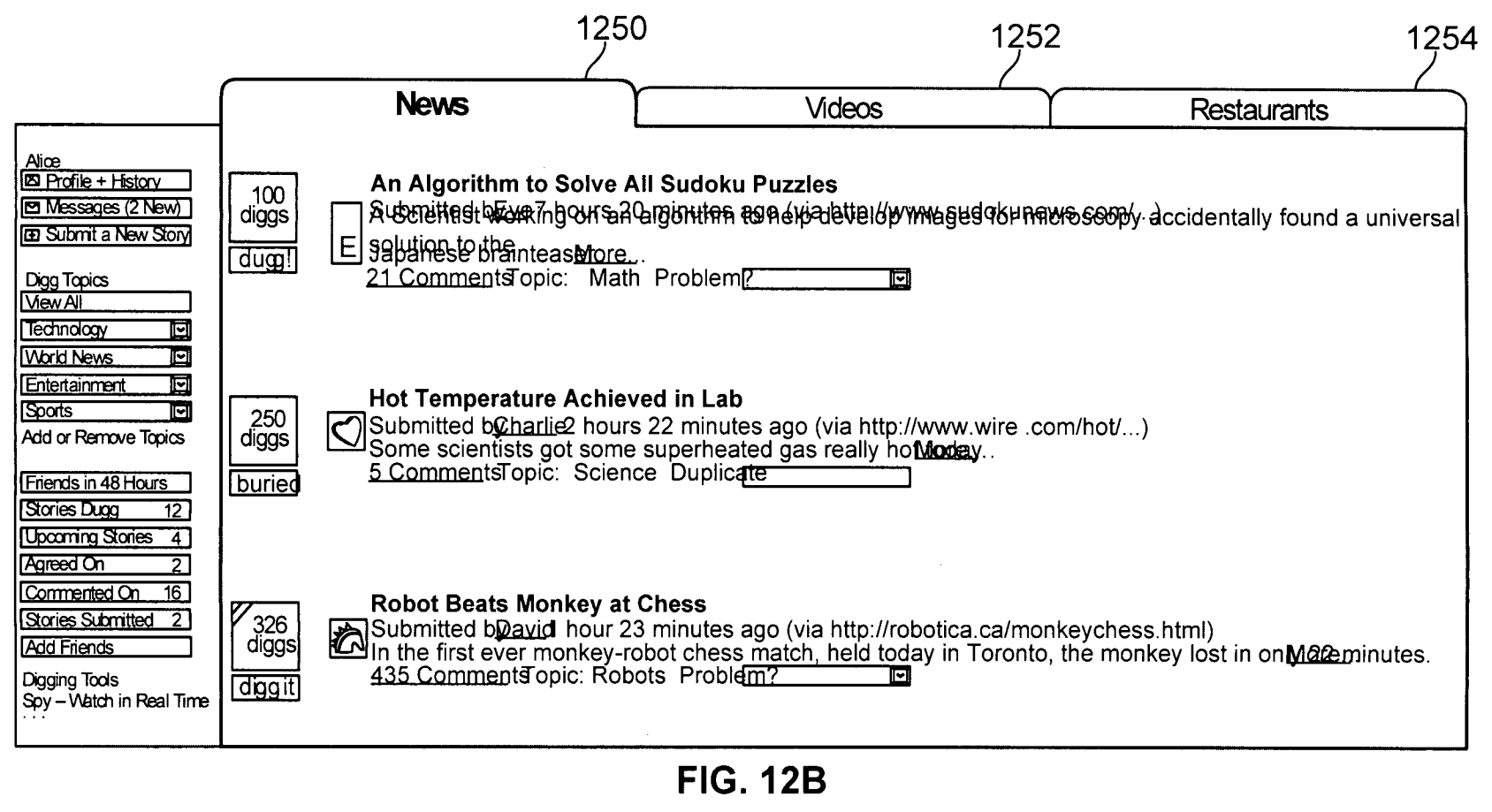

FIG. 12B illustrates an embodiment of an interface to a preference system. In the example shown, the interface unifies a user's preference for things across multiple genres of content. For example, the user can digg for news (1250), videos (1252), and restaurants (1254) all through the same interface. As described in more detail below, the friends features described above can also be used in conjunction with other types of content contributions. For example, using the interface shown in FIG. 12B, a visitor to Alice's profile can learn which news stories she's been digging as well as learn which restaurants she diggs or doesn't digg. Similarly, Alice can customize the views of each of the tabs (1250, 1252, 1254) to display only restaurants her friends of agreed on, restaurants nearby (e.g., by selecting a region on a map or entering a ZIP code) that at least one friend has dugg, etc.

FIG. 12C illustrates an embodiment of an interface to a preference system. In the example shown, digging functionality has been combined with mapping functionality. When a user searches a map, such as a web-based map service, for nearby restaurants, entries on the map include an indication of the number of diggs a business has had and the ability to digg or comment on the business directly from the map interface.

Figure 13A:
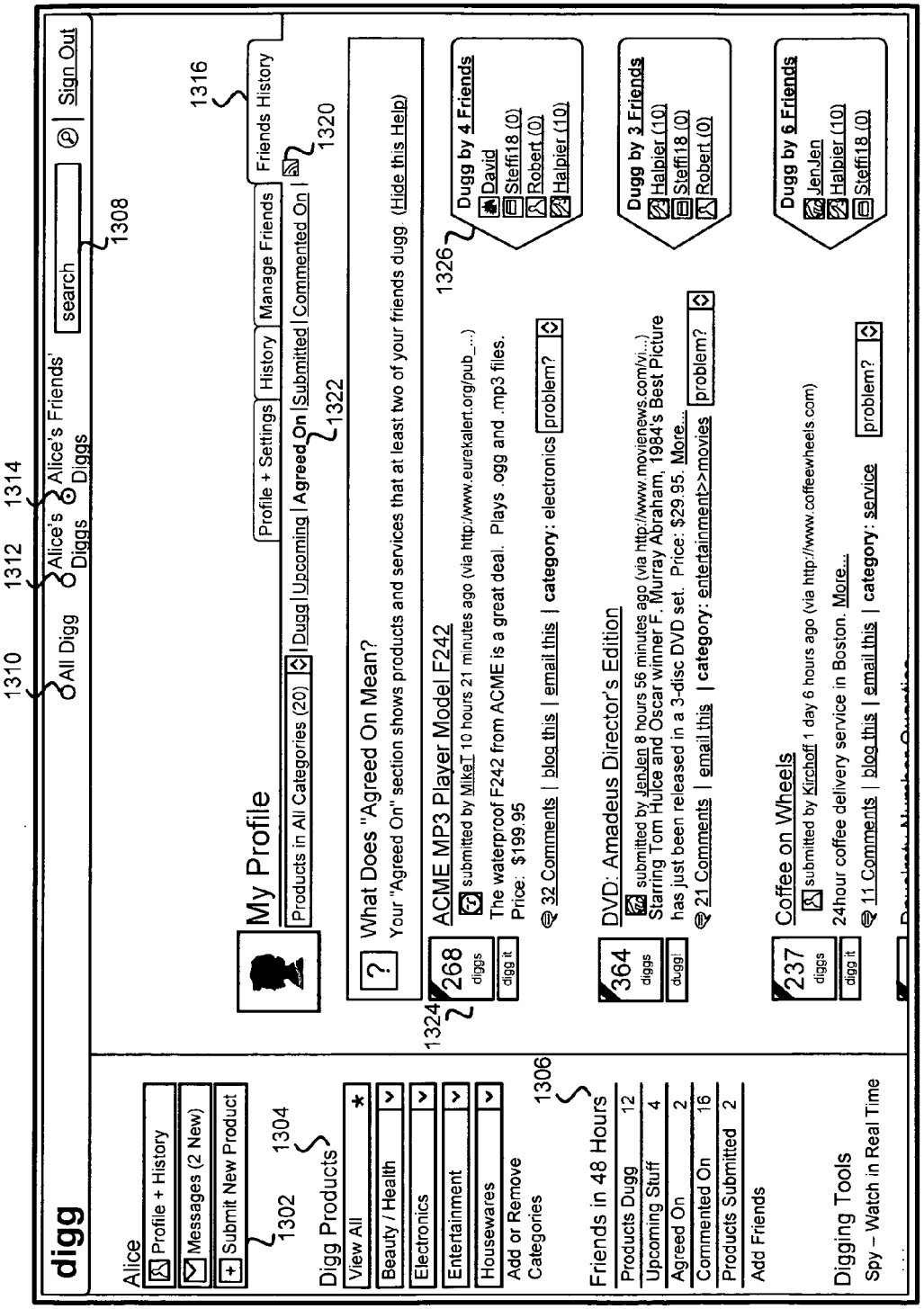
FIG. 13A illustrates an embodiment of an interface to a preference system.

FIG. 13A illustrates an embodiment of an interface to a preference system. The example shown is an implementation of a portion of website 116 which includes the ability to submit, digg, and comment on products (including software), as rendered in a browser. In this example, Alice has selected to view products agreed on by her friends (1322).

Alice can submit a new product review by selecting portion 1302 of interface 1300. She can view products in one or more categories by selecting the appropriate portion of region 1304. Portion 1306 of interface 1300 displays the recent activities of Alice's friends in a dashboard format.

Region 1326 of interface 1300 indicates that four of Alice's friends have dugg product 1324, the ACME MP3 player. Alice can also see which of her friends have dugg product 1324 by hovering her input device over the digg score box of product 1324. In some embodiments, Alice can interact with region 1326, such as by being presented with a dialogue that offers to send an email to all of her friends listed in the region. In some embodiments, additional actions can be taken with product 1324. For example, Alice may be presented a "buy this product now" icon or link.

All of the views shown in FIG. 13A can be syndicated as RSS feeds by selecting RSS link 1320 on the appropriate page view. For example, if Alice is a professional critic, users and those who choose not to use web site 116 on a regular basis can syndicate comments that she makes on products, etc.

In some embodiments, profile visitors (including Alice) are presented with the option to search (1308) all of site 116 for product keywords (1310), search Alice's diggs for product keywords (1312), and/or search diggs made by Alice's friends for product keywords (1314). For example, a visitor to Alice's profile can search for MP3 players that she has dugg or commented on. In some embodiments, search interface 1308 includes the ability to filter results on meta information such as regions for DVDs, languages for books, etc. In some embodiments, views (and searches) can be limited by other factors, such as location (distance from Alice), availability (whether a product is in stock and how quickly it can arrive), etc.

Figure 13B:
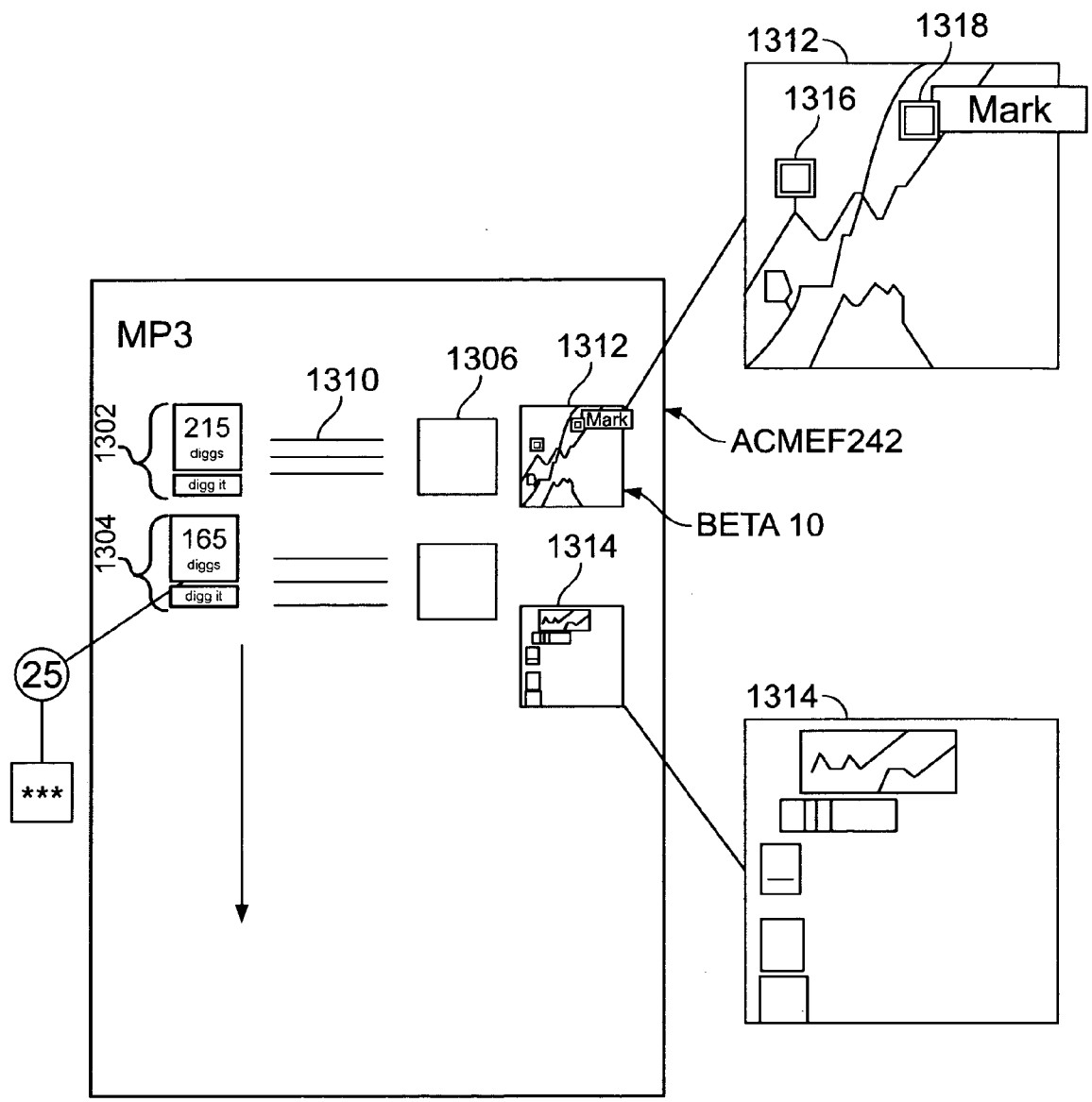
FIG. 13B illustrates an embodiment of an interface to a preference system.

FIG. 13B illustrates an embodiment of an interface to a preference system. The example shown is, as rendered in a browser, an implementation of a portion of website 116 that includes the ability to submit, digg, and comment on products. In this example, Alice has selected to view products in the category, MP3 player, from a larger set of categories, such as those listed in region 1304 of FIG. 13A.

In the example shown, each product listing (1302, 1304) includes a photograph of the MP3 player (1306), as well as a digg score/digg box (1308), title, description, etc. (1310). The MP3 players shown in this example are sorted by popularity.

On the right hand side are assorted graphs (1312, 1314) of information associated with the products shown. Graph 1312 compares the popularity (e.g. digg scores, number of comments recently made, etc.) of different MP3 players against each other over time so that trends such as which ones are gaining in popularity and which ones are decreasing in popularity can be visually determined.

In the example shown, the Acme F242 player is more popular than the Beta 10 player. In some embodiments, the frequency with which a user visits preference system is considered when determining the popularity of a product. For example, suppose the Beta 10 player has 165 diggs, 25 of which were made by users who have not visited the preference system in 3 months. In some embodiments, the diggs of those 25 users are expired. The product will remain listed in the absent user's profiles, but their diggs will not be included when calculating the popularity of the product.

Users also have the ability to undigg a product to indicate that they've moved onto something new. For example, suppose Alice currently has a Beta 10 player and is interested in upgrading. If she purchases an Acme F242, she can visit her profile to undigg the Beta 10 and digg the Acme F242. Her actions—undigging the Beta 10 and digging the Acme F242 instead—will also be reflected in graph shown at 1312. For example, on the day that she undiggs the Beta 10, its position along the vertical axis will be decreased. On the day that she diggs the Acme F242, the Acme F242's position on the graph will similarly increase.

Graph 1312 also includes indications of the individual users who are taking digging and undigging actions. For example, when Alice hovers her mouse over region 1318, she can see that a user, Mark, dugg the Acme F242. Indications of actions taken by her friends are also included on graph 1312. For example, regions associated with friends' diggs of the Acme F242 are highlight in green, or with avatars, or other indicators that her friends have indicated preferences at a particular time. For example, Alice can use graph 1312 to determine that David dugg the Acme 242 two months after Charlie dugg the Beta 10.

The information shown in FIG. 13B can also be generated based on one or more searches in addition to or instead of tabbed browsing. For example, Alice could perform a search of "popular MP3 players at least one of my friends owns" and see the information shown in FIG. 13B as a result.

In some embodiments, demographic information is displayed. For example, in graph 1314, the popularity of a particular MP3 player is broken down by assorted groups such as teens and adults, or girls and boys. Demographic information can similarly be included in a search so that, for example, a parent shopping for a present for his or her child can locate the "hottest MP3 players among teenagers this week," and the "most popular movie for women aged 20-30," through a search interface configured to accept such queries.

Figure 14:
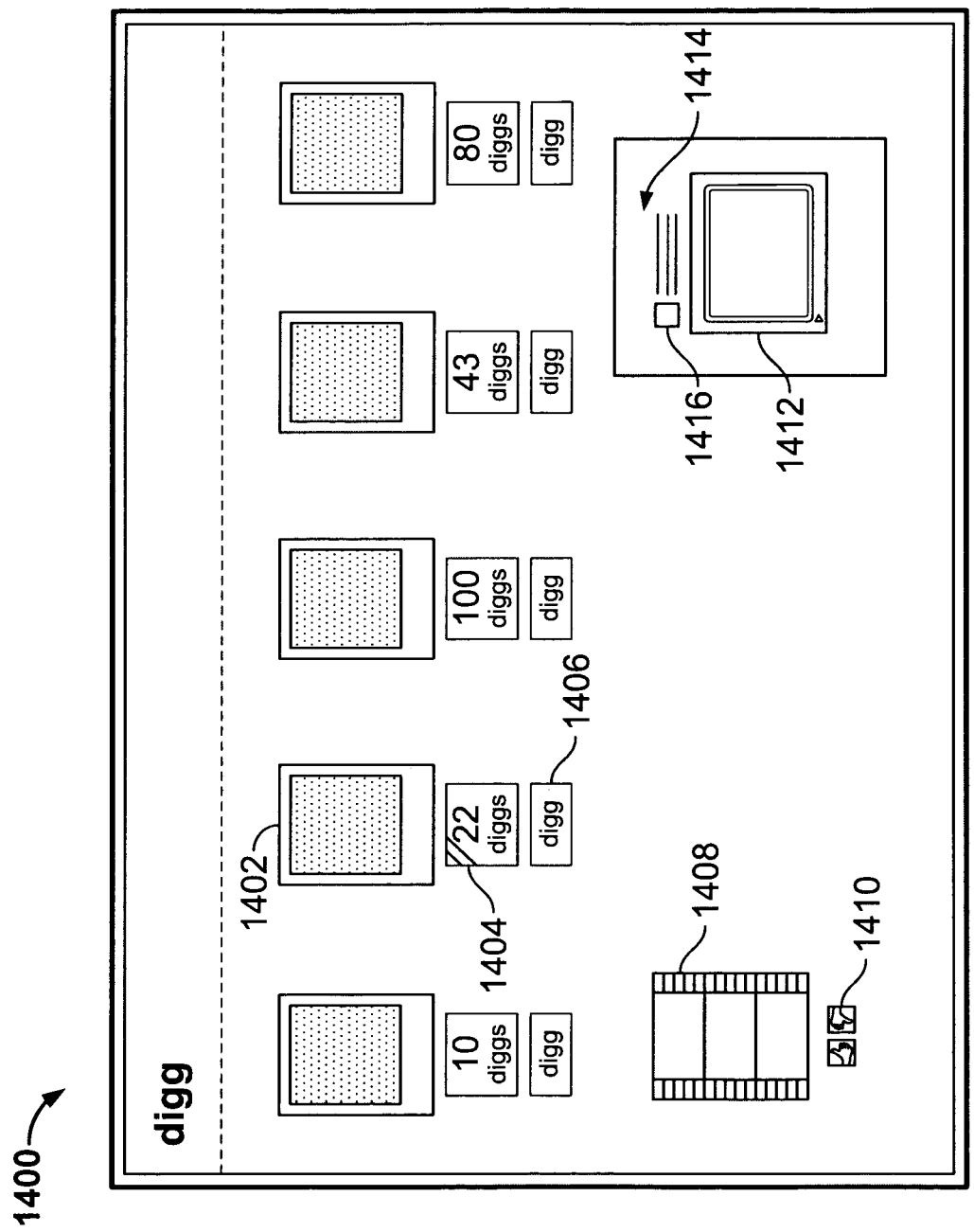
FIG. 14 illustrates an embodiment of an interface to a preference system.

FIG. 14 illustrates an embodiment of an interface to a preference system. The example shown is an implementation of a portion of website 116 which includes the ability to submit, digg, and comment on photographs and video, as rendered in a browser. In the example shown, photograph 1402 was dugg by a friend, as indicated by banner 1404. By selecting digg box 1406, a visitor can indicate a preference for the photograph shown. In some embodiments, visitors indicate their preference for content such as video 1408 by selecting an icon such as icon 1410.

The content shown in interface 1400 can be presented in a variety of ways. For example, video content may be represented as an icon, such as the filmstrip icon shown at 1408. A screen shot of the first frame of the video may also be shown, and interactions, such as hovering a mouse over region 1408 could trigger actions such as causing the video to be played in the browser.

In some cases, it may not be possible to embed the content directly into the interface shown in FIG. 14. In such a case, the video is shown in a format similar to story entry 170 (1416), and a preview button 1414 is included. When preview button 1414 is selected, a video player 1412 automatically slides out in which the video can be displayed.

Permalink pages such as the one shown in FIG. 4 can be adapted for photograph and video content as appropriate, and users may comment, blog, and take other actions with respect to visual and other content (such as songs) as appropriate.

Dynamic Submission and Preference Indicator

Figure 15A:
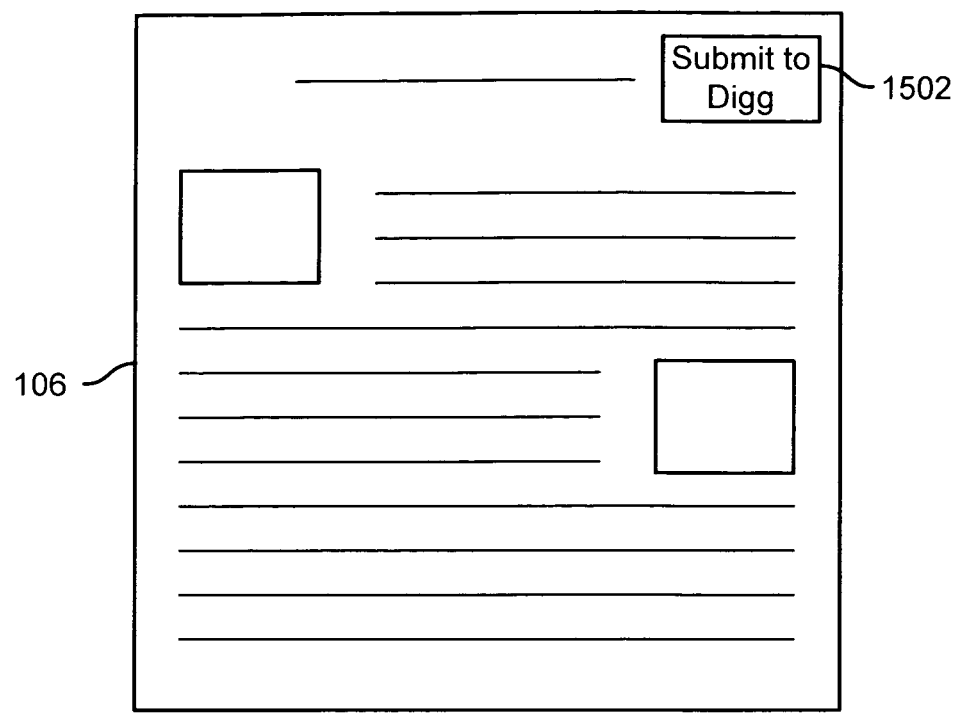
FIG. 15A illustrates an embodiment of a dynamic submission and preference indicator.

FIG. 15A illustrates an embodiment of a dynamic submission and preference indicator. As described in more detail below, a dynamic submission and preference indicator (1502) can be incorporated into a page, such as web page 106 and encourages visitors to submit or digg the content they are viewing. Preference indicator 1502 displays one of two images based on whether web page 106's URL has been submitted to preference system 102 or not, and if so, what the digg score (172) of the story (podcast, video, etc.) is. In the example shown in FIG. 15A, the story appearing on page 106 has not yet been submitted to preference system 102 and the indicator invites visitors to web page 106 to "submit to Digg" the story.

Figure 15B:
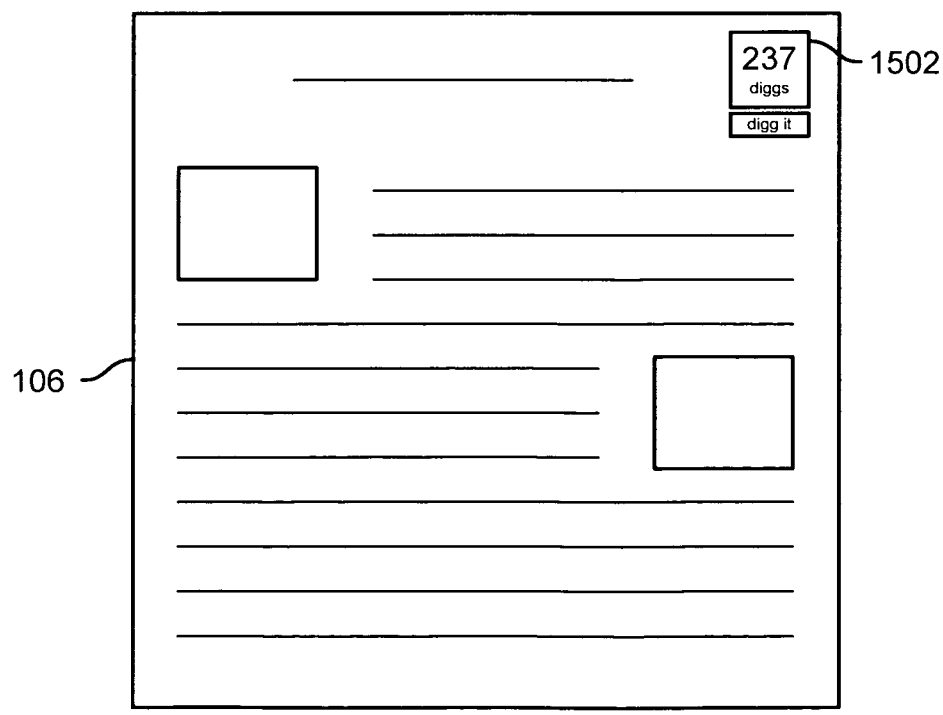
FIG. 15B illustrates an embodiment of a dynamic submission and preference indicator.

FIG. 15B illustrates an embodiment of a dynamic submission and preference indicator. Suppose a visitor to web page 106 interacts with indicator 1502 as shown in FIG. 15A, for example by clicking on it. As described in more detail below, the story appearing on web page 106 would then be submitted to preference system 102. Additionally, any subsequent viewers of web page 106 (or the visitor, e.g., upon the page refreshing) would be presented with an indication of the current, real-time digg score of the story appearing on the page and be invited to "digg" the story instead of submitting it. In the example shown in FIG. 15B, the story has been dugg 237 times. In some embodiments, if the visitor is erroneously presented with the button shown at 1502 in FIG. 5A (e.g., because the story appearing on page 106 was submitted by another user after the visitor loaded page 106, but before the visitor refreshed the page), if the visitor attempts to "submit to Digg" the story, instead of being presented with an error, the visitor is directed to the permalink for the story.

Figure 16:
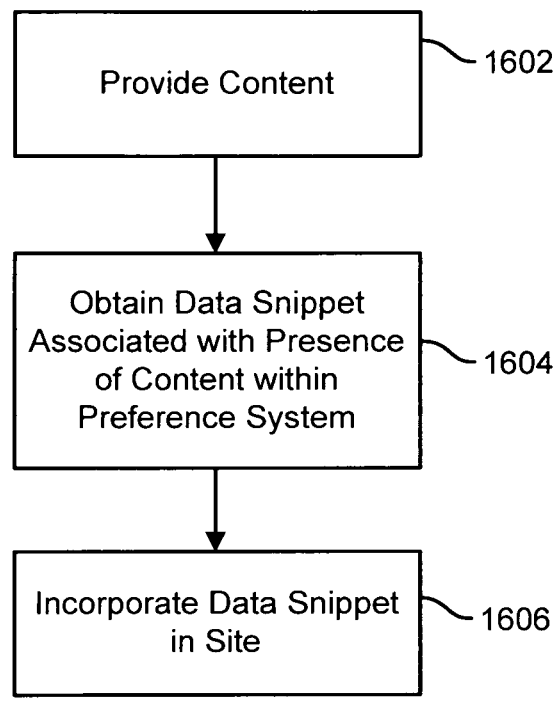
FIG. 16 is a flow chart illustrating an embodiment of a process for incorporating a dynamic submission and preference indicator on a web page.

FIG. 16 is a flow chart illustrating an embodiment of a process for incorporating a dynamic submission and preference indicator on a web page. In some embodiments the process shown in FIG. 16 or portions thereof is performed by the execution of code incorporated in web page 106 (e.g., Javascript) or working in conjunction with web page 106 (e.g., an API call), both of which are referred to herein for simplicity as being "executed by web page 106," "performed by web page 106," or using similar language. In some embodiments the process shown in FIG. 16 or portions thereof is performed by an administrator of web page 106 or by a combination of an administrator and web page 106.

The process begins at 1602 when content is provided. For example, at 1602 a freelance writer writes a new blog post which is made available on web page 106. Other examples of content provided at 1602 include the posting of photographs to a photograph service, the authoring of a restaurant or product review, and the uploading of a podcast or video to a host.

At 1604, a data snippet associated with the presence and/or status of the content within preference system 102 is obtained. The data snippet is used by web page 106 in conjunction with preference system 102 to obtain information about the presence of the content provided at 1602 within preference system 102. The data snippet may take a variety of forms based on factors such as the architecture of web page 106, how much control the administrator of web page 106 has over web page 106, etc. Examples of data snippets are described in more detail below. Examples of ways in which data snippets can be obtained include by having the administrator of web page 106 use a documented API, having the author of web page 106 interact with a form provided by preference system 102 or another external source (e.g., by entering the URL of page 106 and other information and receiving back Javascript that can be included in page 106), etc. In some embodiments preference system 102 makes available scripts, widgets, or other features that can be placed onto web page 106.

At 1606, the data snippet obtained at 1604 is incorporated into web page 106 (and/or the site hosting web page 106). Incorporation may be performed manually, such as by hand editing page 106, or may be performed automatically. In some embodiments a system administrator associated with web page 106 makes use of documented API calls to implement the techniques described herein. In such a scenario, portion 1604 of the process shown in FIG. 16 may be omitted or combined with portion 1606 as applicable.

Figure 17:
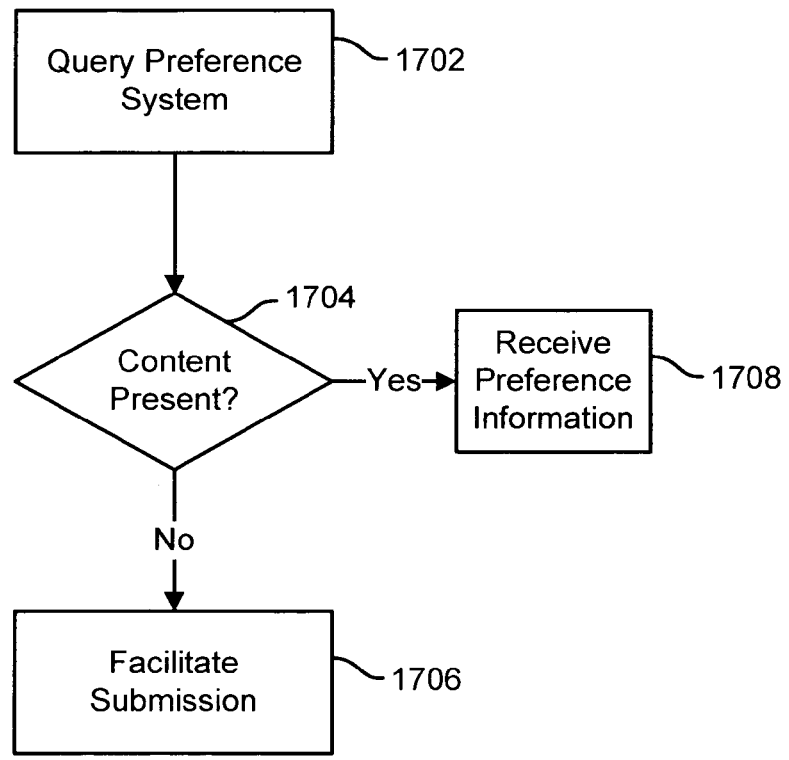
FIG. 17 is a flow chart illustrating an embodiment of a process for indicating preference for a content contribution.

FIG. 17 is a flow chart illustrating an embodiment of a process for indicating preference for a content contribution. In some embodiments the process shown in FIG. 17 is performed by web page 106. The process begins at 1702 when preference system 102 is queried for the presence of content. For example, at 1702, a query is submitted to preference system 102 by using the data snippet obtained at 1604 in the process shown in FIG. 16. If preference system 102 determines (1704) that the content for which preference information is sought is present within preference system 102, preference system 102 provides preference information which is received by web page 106 at 1708. If preference system 102 determines that the content for which preference information is sought is not present within preference system 102, preference system 102 and web page 106 cooperate to facilitate the submission of the content to preference system 102 at 1706. In some embodiments web page 106 uses an iframe element to render the received preference information to the visitor.

Suppose, for example, a photographer has recently uploaded a photograph to a photograph sharing website, such as by performing portion 1602 of the process shown in FIG. 16. The photograph sharing website has incorporated within it data snippets such as are obtained at portion 1604 of the process shown in FIG. 16. When a visitor visits the photographer's web page, a data snippet incorporated into that page queries preference system 102 to determine whether the photograph is present within preference system 102 or not. If the photograph is not present within preference system 102, at 1706, a button is displayed to the visitor with the text label "This photograph is cool! Submit it for review!" If the visitor clicks on the button, the URL of the photograph is automatically submitted to preference system 102 as a content submission. Information such as the category to which the photograph belongs (e.g., "sports" or "election"), the title of the photograph (e.g., "New world record caught on film"), and other submission-related information can be embedded in page 106 so that when the first visitor decides to submit the photograph to preference system 102, the relevant submission information is prefilled.

Other actions can also be employed, as applicable, such as by redirecting the visitor to a form into which the visitor can provide information about the photograph, creating a popup window soliciting additional information, etc. If the photograph is already present within preference system 102, at 1708 web page 106 informs the visitor what other individuals' preference for the photograph are, e.g. via text and/or a score ("200 people like this photo"), via icons (showing a flame next to the photograph if a threshold number of individuals rate the photograph), or with other indicators, such as sounds or animations. If the visitor clicks on the button, examples of appropriate actions include that the digg count of the photograph be increased, that the visitor be taken to the permalink page of the photograph, that the visitor's cookies be evaluated to determine whether the visitor has an account with preference system 102 in conjunction with either of these actions, etc.

Figure 18:
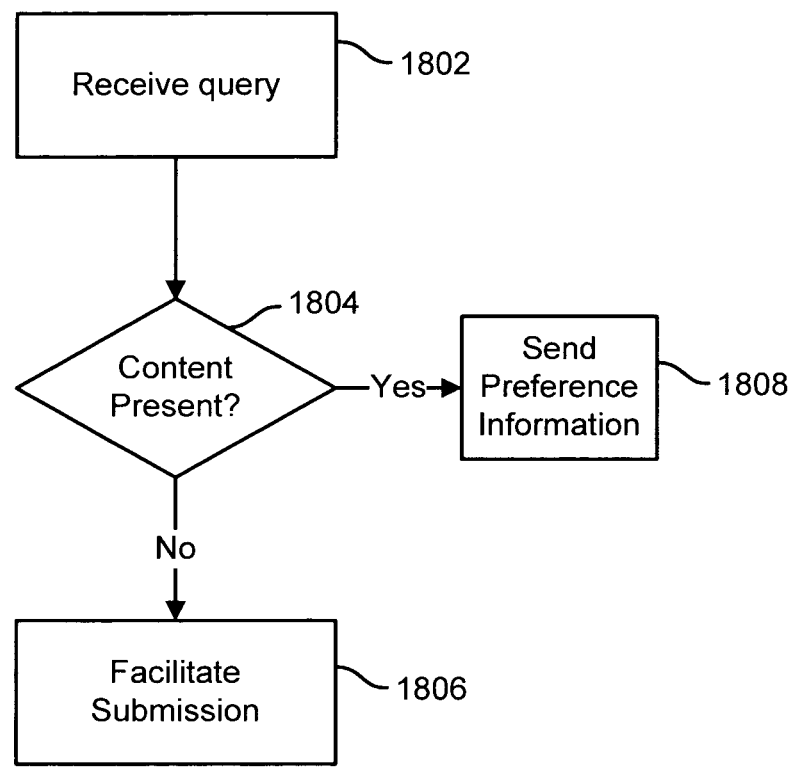
FIG. 18 is a flow chart illustrating an embodiment of a process for indicating preference for content contribution.

FIG. 18 is a flow chart illustrating an embodiment of a process for indicating preference for content contribution. In some embodiments the process shown in FIG. 18 is performed by preference system 102. The process begins at 1802 when a query for the presence of content is received. For example, at 1802, a query is received by system 102 from an API call made by web page 106. If preference system 102 determines (1804) that the content for which preference information is sought is present within preference system 102, preference system 102 provides preference information to the requester at 1808. If preference system 102 determines that the content for which preference information is sought is not present within preference system 102, preference system 102 (e.g., in conjunction with the requester) facilitates the submission of the content to preference system 102 at 1806.

Figure 19:
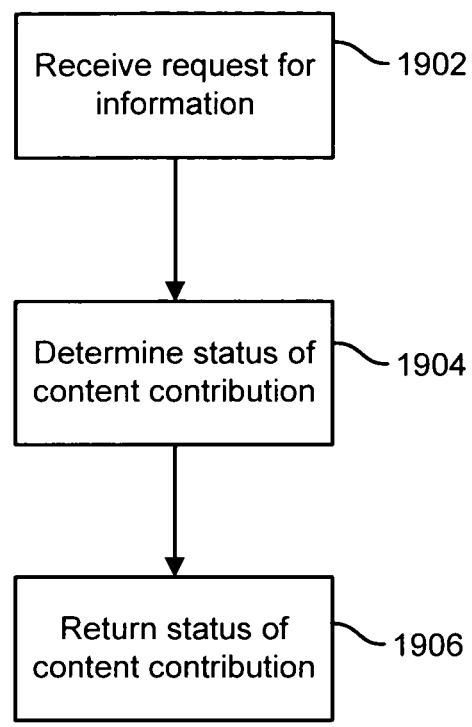
FIG. 19 is a flow chart illustrating an embodiment of a process for indicating preference for a content contribution.

FIG. 19 is a flow chart illustrating an embodiment of a process for indicating preference for a content contribution. In some embodiments the process shown in FIG. 19 is performed by preference system 102. The process begins at 1902 when a request for information associated with a content contribution is received. For example a request like that submitted at 1702 in FIG. 17 or like the received at 1802 in FIG. 18 is received at 1902.

At 1904, the status of the content contribution is determined. Examples of status that can be determined at 1904 include whether the content contribution was previously submitted to preference system 102, if so, how many diggs (or other positive preference events) the content contribution has received, whether the content contribution has received any burries (or other negative preference events), how many comments have been received, etc. In some embodiments the request may contain additional parameters, such as ones requesting the returned status be limited to particular types of status information (e.g., preference events in the last 12 months, number of comments received on the content's permalink page but not number of diggs, preference events from users of preference system 102 who are also users of the site hosting web page 106, preference events from certain demographics or groups of individuals, etc.). The status received can also be customized, by system 102, page 106, and/or both, based on the type of content for which preference information is sought. For example, if the content is a podcast, one set of images might be used, while if the content is a product, another set might be used. In the case of a restaurant, the number of diggs might be returned, along with additional information, such as the most recent review.

At 1906, the status of the content contribution is returned. In the example shown in FIG. 19, whether or not the content contribution is already present within preference system 102 is treated as a preference and portions of the processing shown in FIGS. 17 and 18 are omitted as applicable. For example, preference system 102 may be configured to respond only if it has data associated with the content contribution and otherwise to send a null value back to page 106, instead of or in addition to facilitating the submission of the content contribution.

FIG. 20 illustrates an example of a data snippet according to one embodiment and example responses. In the example shown, when web page 106 submits an HTTP request to preference system 102 using the URL shown at 2002 (requesting preference information for the content located at http://diggtheblog.com), preference system 102 will respond with the null data shown at 2006 if the URL has not yet been submitted to preference system 102 (e.g. via the submission process shown in FIG. 2) and will respond with the XML shown at 2004 if the URL was previously submitted to preference system 102. Examples of the information provided by preference system 102 include that the content has received 2127 diggs, 171 comments, and has been promoted. The received information can be used by web page 106 to render preference information for visitors to web page 106 according to formatting rules specified by page 106. The received information can also be used in conjunction with default images, widgets, or other stock indicators provided by preference system 102. For example, if the null result is received, the button shown at 1502 if in FIG. 15A can be rendered for the viewer of page 106. If the XML shown at 2004 is received, the button shown at 1502 in FIG. 15B can be rendered instead.

FIG. 21A illustrates an example of a data snippet. The example shown is used in some embodiments by web page 106 to indicate that a dynamic submission and preference indicator should be shown on web page 106 and provide information about the preference for a content submission included on web page 106.

FIG. 21B illustrates an example of a data snippet. The example shown is used in some embodiments by one web page to indicate that a dynamic submission and preference indicator should be shown on that web page and provide information about the preference for a content submission included on a different web page. The snippet shown in FIG. 21B can also be used to provide user-specific and/or session data in the URL and the resulting indicator to use a specific version of the URL. The snippet can also be used to have multiple indicators on the same page.

FIG. 21C illustrates an example of a data snippet. The example shown is used in some embodiments to change the appearance of the indicator. Parameters such as the background color of a button (digg_bgcolor), the size of the button (digg_skin), and whether clicks should open a new window or remain within the same window (digg_window) can be specified.

FIG. 21D illustrates an example of a data snippet. The example shown is used in some embodiments to specify defaults for submission. Information such as the type of content (digg_media), the topic (e.g., politics or sports), the title, and description of the content can be prefilled. In some embodiments when a visitor submits the content on page 106 to preference system 102, the visitor is presented with the prefilled information as part of the submission process, but is also permitted to overwrite the information. In other cases, certain fields (e.g., title) may not be changed by the submitting visitor.

In some embodiments, the dynamic submission and preference indicator is branded, e.g., by the site hosting web page 106. For example, suppose web page 106 is the front page of a national newspaper's website and lists all of the articles that appeared in the daily version of the newspaper and is a partner of the entity that controls preference system 102. In that scenario, the national newspaper may not wish for its visitors to be directed away from the website hosting page 106, and/or would like to have control over the user experience visitors will have when logging into/being directed to website 116. In such a case, web page 106 may have incorporated within it a link of the form: http://digg.com/remote-submit?phase=2&url=www.example.com&title=StoryTitle&bodytext=StoryDescription&topic=YourSelectedTopic". The URL and associated popup code can also be obfuscated to help prevent third parties from copying the code and implementing it for themselves. When the dynamic submission and preference indicator is manipulated by a visitor in this scenario, a new window is opened and specially formatted versions of the submit, permalink, login, registration, and other screens are presented, instead of the default versions that would be presented if the visitor visited website 116 directly. Additionally, the submission process may be configured to not require submitters from the national newspaper's website to login to preference system 102.

The specially formatted pages allow the users of the partner site to not feel like they have left the partner site, so that when they have submitted content to preference system 102, they can more easily return (or remember to return) to page 106. In some embodiments, if a visitor is put in contact with preference system 102 via a partner site such as the national newspaper website (e.g., by clicking a "submit to digg" button), but is not currently registered with preference system 102, the submission is "held" by preference system 102 until the user completes a registration, but upon completion of the registration, the submission is released from the hold and the user is directed to the permalink for the page that they submitted.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising, at an automated preference system comprising a set of computer processors:
   receiving a request from a first entity external to the preference system while the first entity is displaying a prospective content contribution; and
   operating the set of processors to:
      determine whether the prospective content contribution was previously submitted to the preference system;
      if the prospective content contribution was not previously submitted to the preference system, issue a first response comprising a first interactive button manipulable to submit the prospective content contribution to the preference system; and
      if the prospective content contribution was previously submitted to the preference system, issue a second response comprising:
         a second interactive button manipulable to indicate a preference for the prospective content contribution; and
         preference information identifying a number of activations of the second interactive button.

2. The method of claim 1 wherein determining whether the content contribution was previously received includes determining whether the content contribution was previously received from a third entity.

3. The method of claim 1 further comprising operating the set of processors to:
   provide a second entity with an indication of the preference information;
   wherein the indication provided to the second entity is a score.

4. The method of claim 1 further comprising operating the set of processors to:
   facilitate the submission of the content contribution.

5. The method of claim 1 wherein the preference information includes a score.

6. The method of claim 4 wherein facilitating the submission of the content contribution includes obtaining a URL.

7. The method of claim 1 wherein a copy of the content contribution is hosted by the first entity.

8. The method of claim 1 further comprising operating the set of processors to:
   provide a data snippet to the first entity.

9. The method of claim 1 wherein the content contribution is a podcast.

10. The method of claim 1 wherein the content contribution is a video.

11. The method of claim 1 wherein the content contribution is a review.

12. A system, including:
   a processor; and
   a memory coupled with the processor, wherein the memory is configured to provide the processor with instructions which when executed cause the processor to:
      receive a request from a first entity external to the system while the first entity is displaying a prospective content contribution;
      determine whether the prospective content contribution was previously submitted to the preference system;
      if the prospective content contribution was not previously submitted to the preference system, issue a first response comprising a first interactive button manipulable to submit the prospective content contribution to the preference system; and
      if the prospective content contribution was previously submitted to the preference system, issue a second response comprising:
         a second interactive button manipulable to indicate a preference for the prospective content contribution; and
         preference information identifying a number of activations of the second interactive button.

13. The system of claim 12 wherein determining whether the content contribution was previously received includes determining whether the content contribution was previously received from a third entity.

14. The system of claim 12 wherein the memory is further configured to provide the processor with instructions which when executed cause the processor to provide a second entity with an indication of the preference information; wherein the indication provided to the second entity is a score.

15. The system of claim 12 wherein the memory is further configured to provide the processor with instructions which when executed cause the processor to facilitate the submission of the content contribution.

16. The system of claim 12 wherein the preference information includes a score.

17. The system of claim 15 wherein facilitating the submission of the content contribution includes obtaining a URL.

18. The system of claim 12 wherein a copy of the content contribution is hosted by the first entity.

19. A computer program product embodied in a computer readable storage medium and comprising computer instructions for:
- receiving a request from a first entity external to the system while the first entity is displaying a prospective content contribution;
- determining whether the prospective content contribution was previously submitted to the preference system;
- if the prospective content contribution was not previously submitted to the preference system, issuing a first response comprising a first interactive button manipulable to submit the prospective content contribution to the preference system; and
- if the prospective content contribution was previously submitted to the preference system, issuing a second response comprising:
    - a second interactive button manipulable to indicate a preference for the prospective content contribution; and
    - preference information identifying a number of activations of the second interactive button.

20. The computer program product of claim 19 wherein a copy of the content contribution is hosted by the first entity.

21. The method of claim 1 wherein the second interactive button comprises the preference information.

* * * * *